United States Patent
Morioka et al.

(10) Patent No.: US 7,642,747 B2
(45) Date of Patent: Jan. 5, 2010

(54) BATTERY PACK CAPABLE OF DETECTING TAMPERING

(75) Inventors: Toru Morioka, Awagi (JP); Shinichi Itagaki, Sumoto (JP); Hitoshi Hamaguchi, Sumoto (JP); Atsushi Kawasumi, Sumoto (JP); Toru Nishikawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 369 days.

(21) Appl. No.: 11/727,106

(22) Filed: Mar. 23, 2007

(65) Prior Publication Data
US 2007/0229026 A1    Oct. 4, 2007

(30) Foreign Application Priority Data

| Mar. 31, 2006 | (JP) | 2006/098587 |
| May 9, 2006 | (JP) | 2006/130420 |
| Jun. 14, 2006 | (JP) | 2006/164513 |
| Jul. 26, 2006 | (JP) | 2006/204007 |

(51) Int. Cl.
*H01M 10/46* (2006.01)

(52) U.S. Cl. .................................. 320/112

(58) Field of Classification Search ............. 320/107, 320/112, 114, 132, 134, 136
See application file for complete search history.

(56) References Cited

U.S. PATENT DOCUMENTS

| RE36,225 E * | 6/1999 | Harris ................... 320/104 |
| 6,611,774 B1* | 8/2003 | Zaccaria ................ 320/116 |
| 2005/0077878 A1* | 4/2005 | Carrier et al. .......... 320/134 |

FOREIGN PATENT DOCUMENTS

| JP | 2002-311836 | 10/2002 |
| JP | 2003-68267 | 3/2003 |
| JP | 2003-195767 | 7/2003 |

* cited by examiner

*Primary Examiner*—Edward Tso
(74) *Attorney, Agent, or Firm*—Wenderoth, Lind & Ponack, L.L.P.

(57) ABSTRACT

A battery pack provided with a current cut-off device connected in series with batteries, a tamper detector to detect tampering and issue a tamper signal, and a control circuit connected to the tamper detector. If the tamper detector detects tampering with the battery pack, the control circuit switches the current cut-off device off to shut off current to the batteries, or it issues a tamper signal.

25 Claims, 23 Drawing Sheets

BATTERY PACK CAPABLE OF DETECTING TAMPERING

BACKGROUND OF THE INVENTION

1. Field of the Invention

This invention relates to a battery pack that detects case disassembly.

2. Description of the Related Art

User disassembly of the case or modification of a battery pack containing batteries and protection circuitry compromises safety and its prevention is necessary. To implement this, a tamper-prevention feature has been developed that attaches an external label to the surface of the case, and evidence of tampering remains if that label (seal) is broken (see Japanese Patent Application Disclosures 2003-68267, 2002-311836, and 2003-195767). Since the external labels cited in these patent disclosures leave evidence of tampering, they are useful in determining the root cause when a failure or customer-claim develops. Further, as a result of prior knowledge that the external label will leave evidence of tampering if broken, the label has the effect of suppressing the user's initiative to tamper and thereby is linked to tamper-prevention.

SUMMARY OF THE INVENTION

Although an external label as described in the patent disclosures referenced above can leave evidence of tampering, it has the drawback that the user can remove (or break) the external label (seal), disassemble the case, make modifications, reassemble the case, and attach the battery pack to electrical equipment for reuse. Consequently, the safety of the disassembled and modified battery pack cannot be guaranteed.

The present invention was developed with the object of further resolving this deficiency. Thus, it is a primary object of the present invention to provide a battery pack that can reliably prevent the user from disassembling the case or making modifications that compromise battery safety.

The battery pack is provided with current cut-off devices connected in series with the batteries, a tamper detector that outputs a tamper signal if tampering is detected, and a control circuit connected with the tamper detector. Given a tamper detector signal, the control circuit switches a current cut-off device off to shut-off current, or the control circuit can issue a tamper signal. In this battery pack, the control circuit detects user replacement of batteries housed in the battery pack, and turns the current cut-off device off to disable the battery pack. Therefore, use of an altered battery pack with replaced batteries is prevented to reliably guarantee safety. The tamper detector can be a disassembly detection switch that outputs a disassembly signal when it detects disassembly of the case, which houses the batteries. In this battery pack, the control circuit switches off a current cut-off device to shut-off battery current given a disassembly signal from the disassembly detection switch.

This battery pack has the characteristic that user disassembly or modification that compromises battery safety can be reliably prevented. This is because the disassembly detection switch housed in the case detects if a user has disassembled the case and issues a disassembly signal. The control circuit detects the disassembly signal and turns off a current cut-off device to put the battery pack in an unusable state. Specifically, the control circuit turns off a charging switch, turns off a discharging switch, or fuses open a fuse to forcibly disable the battery pack.

The current cut-off device of the battery pack can be the charging switch that controls battery charging, the discharging switch that controls battery discharging, or the fuse connected in series with the batteries. Since either the fuse, the charging switch, or the discharging switch serves the role of current cut-off devices, there is no need to install a special current cut-off device to disable the battery pack in the case of battery replacement. In particular, manufacturing cost can be reduced by dual-purpose use of the fuse, the charging switch, or the discharging switch, which are devices included in the battery pack to control charging and discharging and protect the batteries.

The control circuit of the battery pack can also be provided with memory to store a disassembly signal issued from the disassembly detection switch. In this battery pack, a historical record of case disassembly by the user can be confirmed from information stored in memory.

The disassembly detection switch can also be a light sensor that is switched on or off by light detection. In such a battery pack, the disassembly detection switch is a light sensor, such as a photo-detector, which detects external light when the case is disassembled. Therefore, it has the characteristic that it can consistently and reliably determine case disassembly and provide detection over a long time period without breakdown. In addition, the light sensor can be a photo-coupler. The battery pack can be configured with a rib, which is part of the case, oriented to cut-off light between the light-emitting device and the light-receiving device of the photo-coupler when the photo-coupler and battery pack are in the assembled state. This is a strategy to curb disassembly by making it possible to detect disassembly when it is done in a dark location such as a darkroom.

The disassembly detection switch of the battery pack can also be conducting material.

The case of the battery pack can also be configured with a plurality of mutually interconnecting unit cases, and the disassembly detection switch can be a switch that issues a disassembly signal if the unit cases are disassembled. This battery pack has the characteristic that user disassembly or modification that compromises battery safety can be reliably prevented. This is because the disassembly detection switch detects if the user disassembles the case and issues a disassembly signal. The control circuit detects the disassembly signal and forcibly shuts off a current cut-off device to put the battery pack in an unusable state.

Each unit case of the battery pack houses batteries, and unit cases are provided with connectors, which are connected in the assembled state. Batteries housed in the unit cases can be connected via these connectors. This battery pack has the characteristic that it can be assembled simply, easily, and efficiently. This is because each unit case houses batteries, unit cases are provided with connectors that mutually interconnect in the assembled state, and the batteries housed in unit cases that are joined together are electrically connected via the connectors. A battery pack with this structure can be easily assembled because each unit cell is manufactured separately and joined together for assembly. Further, a disassembly detection switch can be configured as the connectors provided on the unit cases. If the unit cases are disassembled and the connectors separated, the disassembly detection switch can be made to switch off. In this battery pack, connectors provided on the unit cases can serve a dual purpose as a disassembly detection switch. In this battery pack, it is not necessary to provide a separate disassembly detection switch to detect tampering with the case, and the structure can be simplified to reduce manufacturing cost.

Further, the battery pack can be provided with memory to store a cut-off identification (ID) for the control circuit to shut off the current cut-off device given a disassembly signal from the disassembly detection switch. In the battery pack of the present invention, the memory for storing the cut-off ID can be read-write memory. The cut-off ID in memory can be re-written to prevent shut off of the current cut-off device when the unit case is disassembled by authorized personnel. During manufacture or repair, the cut-off ID in memory can be re-written to put this battery pack in a state that does not shut off the current cut-off device even with a disassembly signal when the unit cases are disassembled. After completion of manufacture or repair, the normal cut-off ID can be re-written to memory to shut off the current cut-off device with a disassembly signal. Consequently, the unit cases can be disassembled without shutting off the current cut-off device during manufacture and repair by the maker, and the current cut-off device can be shut off to disable the battery pack when the user has disassembled the unit cases.

Further, the battery pack can have a configuration that is provided with a plurality of batteries, a current cut-off device connected in series with the batteries, a plurality of circuit boards that are mutually interconnected and electrically connect the current cut-off device and the batteries, a disassembly detection switch that detects disassembly of the circuit boards and issues a disassembly signal if circuit board disassembly is detected, and a control circuit that shuts off the current cut-off device to cut-off current flowing in the batteries given a disassembly signal from the disassembly detection switch.

This battery pack has the characteristic that user modification that compromises battery safety can be reliably prevented. This is because the battery pack is configured with a plurality of interconnecting circuit boards, and if a user disassembles the circuit boards, the disassembly detection switch detects disassembly and issues a disassembly signal. The control circuit detects the disassembly signal and turns off the current cut-off device to put the battery pack in an unusable state.

In addition, the battery pack can have a control circuit that is provided with a tamper detector that detects battery replacement from a change in electrical characteristics of the batteries. This battery pack has the characteristic that user replacement of internally housed batteries, which compromises safety, can be reliably prevented. This is because if the user replaces the batteries housed in the battery pack, the control circuit detects this and outputs a tamper signal. Since this battery pack can reliably detect the hazardous modification of user battery replacement, battery pack safety can be assured.

The battery pack houses a plurality of batteries and the control circuit detects electrical characteristics of each battery. The control circuit judges battery replacement based on changes in the electrical characteristics of each battery. This battery pack has the characteristic that the user cannot externally determine the tamper prevention strategy employed by this configuration of battery pack. This is because the battery pack detects electrical characteristics of the plurality of internal batteries and determines battery replacement from changes in the electrical characteristics of each battery. Consequently, no insight is given to the user concerning the structure of the tamper prevention scheme. In other words, it is difficult for the user to conceive of a method of tampering consistent with the battery pack's tamper prevention scheme, and as a result, the battery pack has the characteristic that tampering can be effectively suppressed.

The control circuit can detect the discharge voltage of each battery and detect battery replacement by change in the discharge voltage of each battery or by the order of those discharge voltages.

The control circuit can detect the charging voltage of each battery and detect battery replacement by change in the charging voltage of each battery or by the order of those charging voltages.

The control circuit can detect the discharge voltage of each battery after reaching full charge and detect battery replacement by change in the discharge voltage of each battery or by the order of those discharge voltages.

The control circuit can detect battery capacity and detect battery replacement from change in battery capacity.

The control circuit can be provided with a memory section to store battery voltage prior to low-voltage shutdown of the battery pack. Battery replacement can be detected from the voltage value stored in that memory section. This battery pack also has the characteristic that it can reliably detect user battery replacement. This is because the control circuit utilizes novel characteristics of the battery pack shutdown process to detect battery replacement from the state of a battery before and after shutdown.

Further, the control circuit can detect battery replacement when battery pack shutdown occurs without storing battery voltage in a memory section. In this battery pack, unauthorized battery replacement can be concluded for battery pack shutdown without storing battery voltage in the memory section. Therefore, battery replacement can be reliably detected.

In addition, the control circuit can compare the voltage value stored in the memory section prior to low-voltage shutdown with the battery voltage after restoration of power. If battery voltage after restoring battery pack operation is greater than the voltage value stored in the memory section, battery replacement can be concluded. This battery pack can accurately detect battery replacement even when battery capacity drops and the control circuit becomes inoperative.

Finally, the control circuit can be provided with a specific segment of main memory that is initialized after battery pack activation. If the specific segment of memory retains the initialized state when the battery pack is activated from shutdown, transient power interruption with no battery replacement can be concluded. In this battery pack, shutdown and re-activation due to a temporary interruption of power is not mistakenly judged as battery replacement. The above and further objects and features of the invention as well as the features thereof will become more apparent from the following detailed description to be made in conjunction with the accompanying drawings.

DETAILED DESCRIPTION OF THE PREFERRED EMBODIMENTS

Figure 1:
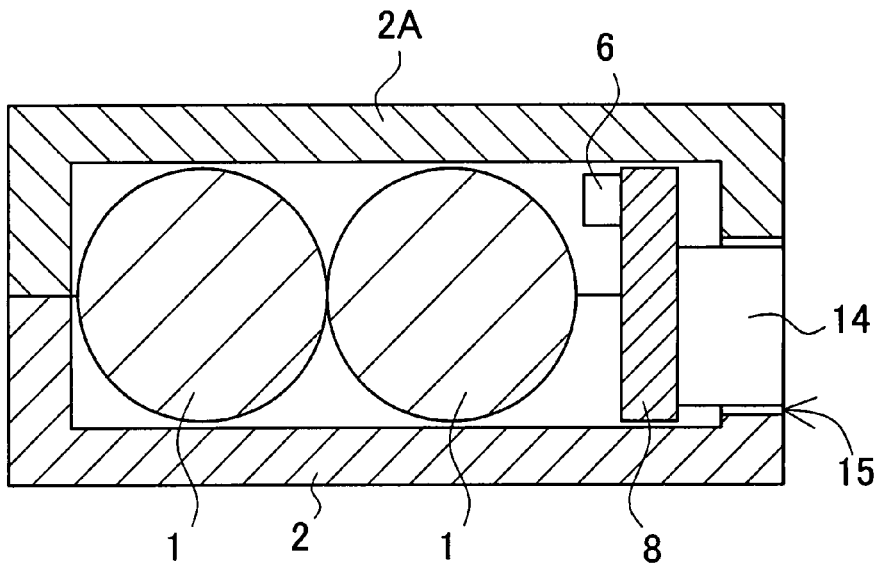
FIG. 1 is an abbreviated cross-sectional view of a battery pack related to an embodiment of the present invention.
Figure 2:
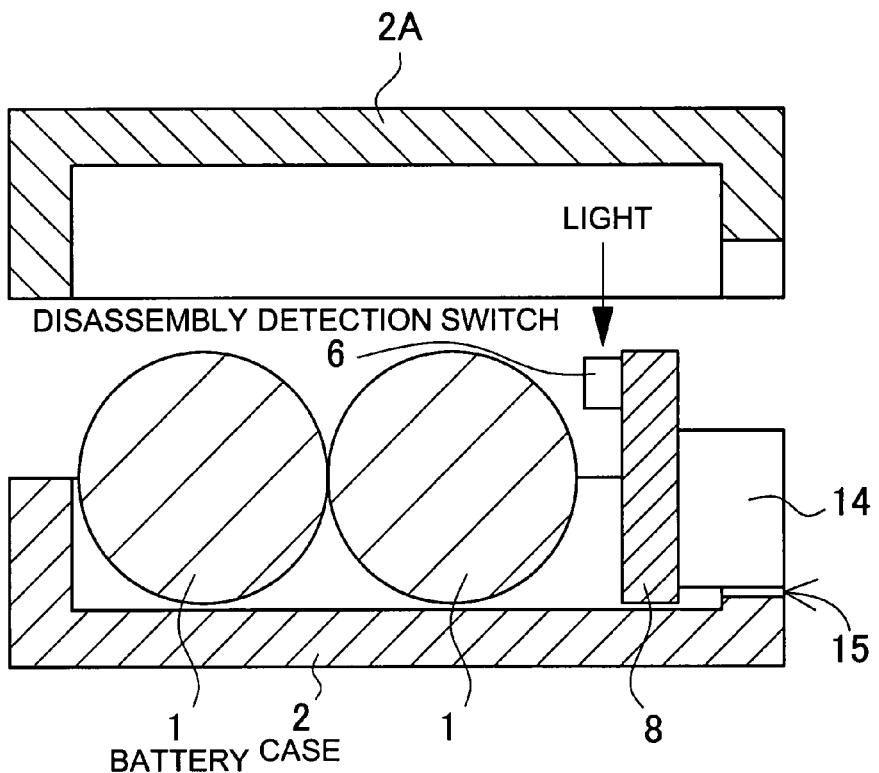
FIG. 2 is an abbreviated cross-sectional view showing the battery pack of FIG. 1 in a disassembled state.

The battery pack shown in FIGS. 1 and 2 has rechargeable circular cylindrical batteries 1, and a circuit board 8 with a protection circuit 9 for the batteries 1 contained in a case 2. The batteries 1 are lithium ion rechargeable batteries. However, the batteries can be any type of batteries that can be charged such as nickel hydrogen batteries or nickel cadmium batteries. A box-shaped resin receptacle, which is well-known technology in this field, can be used as the case 2. As shown in the figures, the case can be divided by a cover 2A, which is the upper half of the case 2. The case 2 can also be box-shaped metal.

Figure 3:
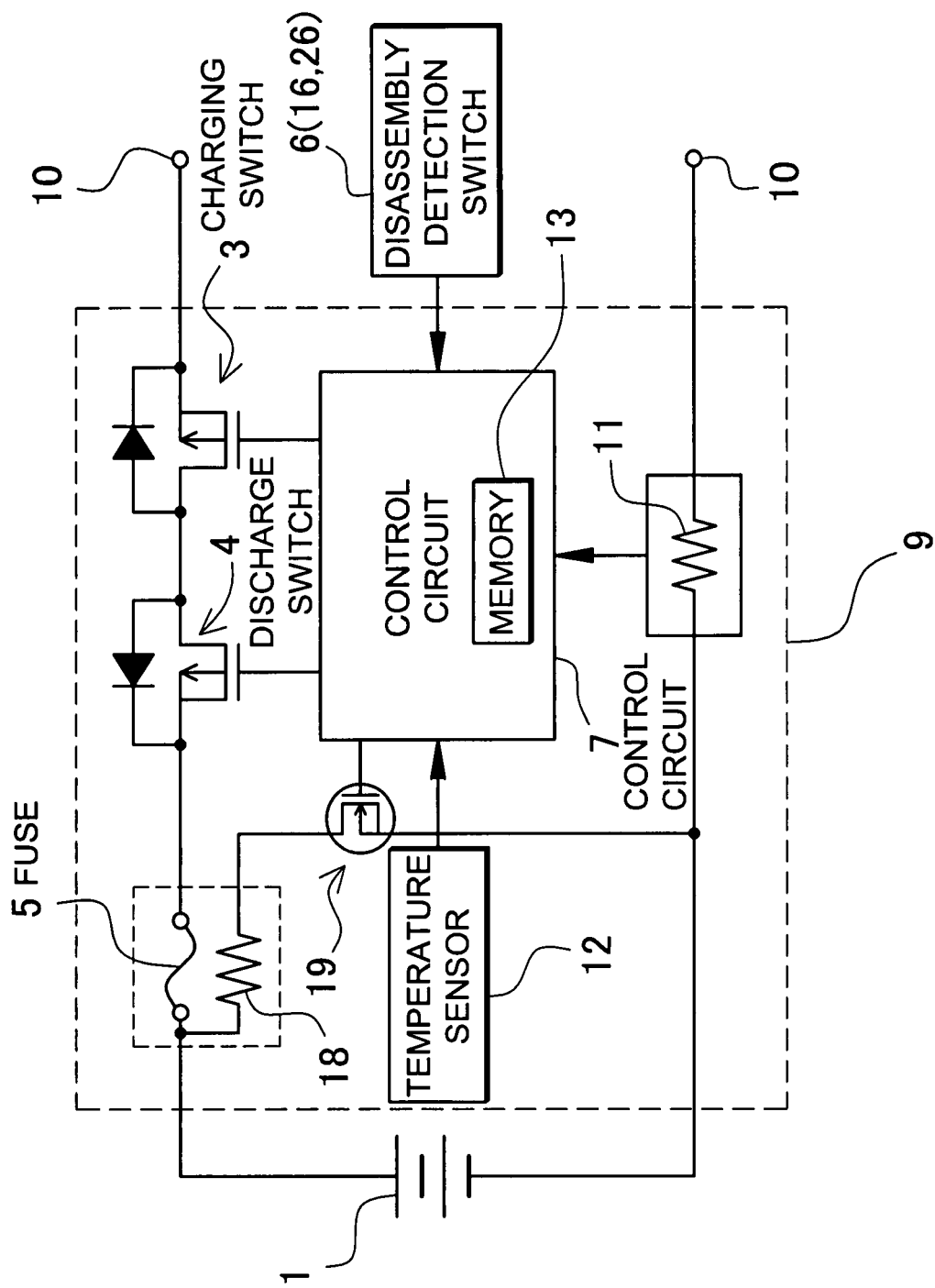
FIG. 3 is a block diagram of a battery pack related to an embodiment of the present invention.

FIG. 3 shows a block diagram for the protection circuit 9 mounted on the circuit board 8. The protection circuit 9 in this figure is provided with a charging switch 3 to control charging current, a discharge switch 4 to control discharging current, a fuse 5 to fuse open for excessive current, a control circuit 7 to control the charging switch 3 and discharge switch 4 on and off as well as to fuse open the fuse 5 for excessive current, and a disassembly detection switch 6 to detect case disassembly.

The charging switch 3, discharge switch 4, and fuse 5 are connected in series between the positive electrodes of the batteries 1 and an output terminal 10. The charging switch 3 and the discharge switch 4 are field effect transistor (FET) devices. However, any device that a control circuit signal can switch on and off, such as semiconductor switching device, for example a bipolar transistor, or a relay can be used as the charging switch and the discharge switch.

The fuse 5 is fused open by excessive current, and in addition is forcibly blown by a signal from the control circuit 7. To forcibly blow the fuse 5, a heating resistor 18 is provided in close proximity to the fuse 5, and a switching device 19 is controlled on and off by the control circuit to pass current through that heating resistor 18. The control circuit 7 turns the switching device 19 on, current flows through the heating resistor 18, the heating resistor 18 generates heat by Joule heating, and this heats and fuses open the fuse 5. The protection circuit 9 is provided with a fuse 5 in series with the batteries 1, and has a cut-off circuit to blow that fuse 5. The cut-off circuit comprises a heating resistor 18 thermally joined to the fuse 5, and a switching device 19 such as an FET connected in series with the heating resistor 18. The cut-off circuit is connected between the positive and negative-sides of the batteries 1, and the gate signal on the switching device 19 is controlled by the control circuit 7. If the control circuit 7 puts the switching device 19 in the on state, current flows from the batteries 1 to the heating resistor 18. As a result, the heating resistor 18 generates heat, and the fuse 5 is blown open. By this action, the battery pack can be made unusable from that time. Previously disclosed technology can be used for this type of protection circuit. For example, Japanese Patent Application Disclosures HEI9-261883, 1997 (see FIG. 4) and 2000-340267 (see FIG. 1) are prior art developed by the present applicant that can be used for this type of protection circuit.

When the batteries 1 reach full charge, the charging switch 3 is switched from on to off to prevent battery over-charging. Similarly, when batteries 1 become completely discharged, the discharge switch 4 is turned off to prevent battery over-discharge. Full charge and complete discharge of the batteries 1 is detected by the control circuit 7. Consequently, the control circuit 7 detects battery current and voltage to compute remaining battery capacity. The protection circuit 9 is provided with a current detection resistor 11 connected in series with the batteries 1 to detect battery current. Voltage across the terminals of this current detection resistor 11 is measured to determine charging current and discharging current flowing through the batteries 1.

The battery pack of FIG. 3 is also provided with a temperature sensor 12 to detect battery temperature. The temperature sensor 12 is a thermistor in close proximity to, and thermally joined to the batteries 1. The temperature sensor 12 changes electrical resistance with battery 1 temperature to detect battery temperature. If battery temperature detected by the temperature sensor 12 becomes greater than a specified temperature, the control circuit 7 turns the charging switch 3 off to terminate charging if the batteries 1 are being charged, or the control circuit 7 turns the discharge switch 4 off to terminate discharging if the batteries 1 are being discharged. If battery temperature becomes abnormally high, the fuse 5 is blown to terminate charging and discharging.

The battery pack of FIG. 3 also houses a disassembly detection switch 6 to detect case 2 disassembly. The disassembly detection switch 6 issues a disassembly signal if it detects disassembly of the case 2. The disassembly detection switch 6 shown in FIGS. 1 and 2 is a light sensor that detects external light when the case 2 is opened. When the case 2 is in a tightly sealed state as shown in FIG. 1, the light sensor receives no light. When the case 2 is disassembled as shown in FIG. 2, the light sensor receives external light and outputs a disassembly signal. This light sensor is a photodiode, phototransistor, or a photo-coupler, which is an integrated circuit containing opto-electronic components such as photodiodes and phototransistors. A photodiode or phototransistor turns on when it receives external light and is off when no light is received. Consequently, when this type of light sensor detects case disassembly, it issues an on signal as the disassembly signal. However, the disassembly signal can also be an off signal obtained by complementing (inverting) the on-off output of the light sensor. The light sensor disassembly detection switch 6 is disposed in a location that receives external light when the case 2 is opened. The light sensor in the battery pack of FIG. 1 is positioned to receive external light with the case 2 cover 2A opened, and specifically is attached to the cover-side of the circuit board 8.

A battery pack with a disassembly detection switch 6 that is a light sensor has a case 2 that shuts out external light (is opaque). Consequently, the case is made of material that does not pass light, and has a tightly sealed structure that does not allow light to be introduced to the interior. The battery pack shown in FIGS. 1 and 2 has a connector 14 provided with output terminals attached to the circuit board 8, and has an electrode opening 15 in the case 2 to expose the connector 14 to the outside. The case 2 is configured to prevent light from entering through this section of the battery pack. Light entry can be prevented with a light-tight seal of the connector 14 in the electrode opening 15. Even if there is a gap between the connector 14 and case 2 at the electrode opening 15, light entry can be avoided with black-colored surfaces in the gap such as light-absorbing dark coloration. In this configuration of case 2, external light does not shine directly inside, but rather reflects off surfaces with dark coloration. In this case 2, external light is absorbed by reflecting off the dark colored surfaces and does not shine inside, or it shines in with markedly weakened intensity.

Although not illustrated, a battery pack with a light sensor as a disassembly detection switch can also be provided with a rib on an inside surface of the case, for example on the inside surface of the cover 2A, to cut-off light from the light-receiving section of the light sensor. Specifically, the case 2 is provided with a light cut-off rib disposed at the location of the light-receiving section of the light sensor. When the case cover of this battery pack is closed, the light cut-off rib covers the light-receiving section of the light sensor to stop light from shining on the light-receiving section. When the case cover is opened, the light cut-off rib exposes the light-receiving section of the light sensor and light shines on the light-receiving section to detect opening of the cover. It is not necessary for this case to be entirely opaque.

In a battery pack with a case 2 formed from plastic, the plastic is made opaque by adding dark coloring, such as dark pigment or die that absorbs external light, to the plastic that forms the case 2. Since metal is opaque, a battery pack with a metal case 2 can shut out external light with a tightly sealed structure having no gaps.

A battery pack having an opaque case 2 and a disassembly detection switch 6 that is a light sensor can reliably detect case disassembly. Further, a light sensor has no physically moving parts, can operate for long periods without failure, and can detect case disassembly in a consistent stable fashion. Here, the light sensor is a photo-detector, but it can be a photo-coupler. The battery pack can be configured with a rib, which is part of the case, oriented to cut-off light between the light-emitting device and the light-receiving device of the photo-coupler when the photo-coupler and battery pack are in the assembled state. This is a strategy to curb disassembly by making it possible to detect disassembly when it is done in a dark location such as a darkroom.

Figure 4:
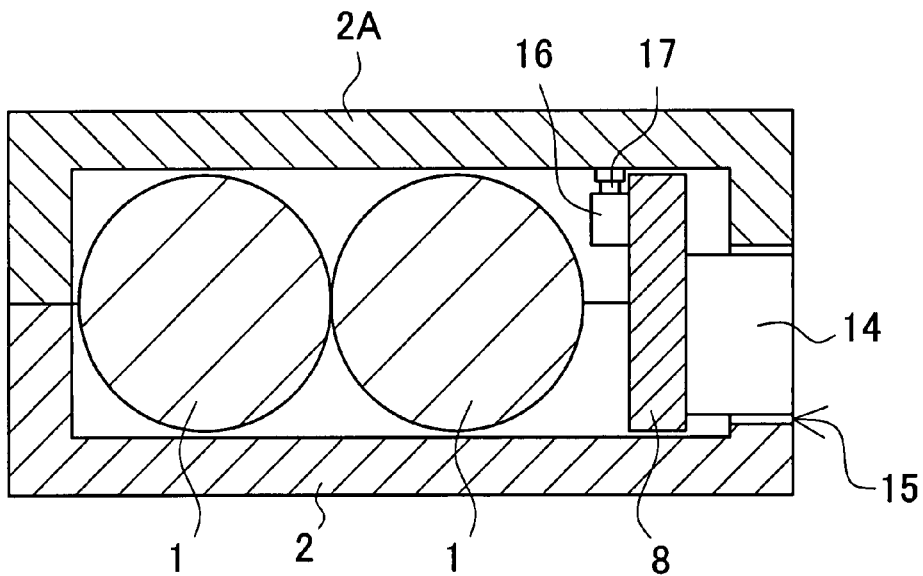
FIG. 4 is an abbreviated cross-sectional view of a battery pack related to another embodiment of the present invention.
Figure 5:
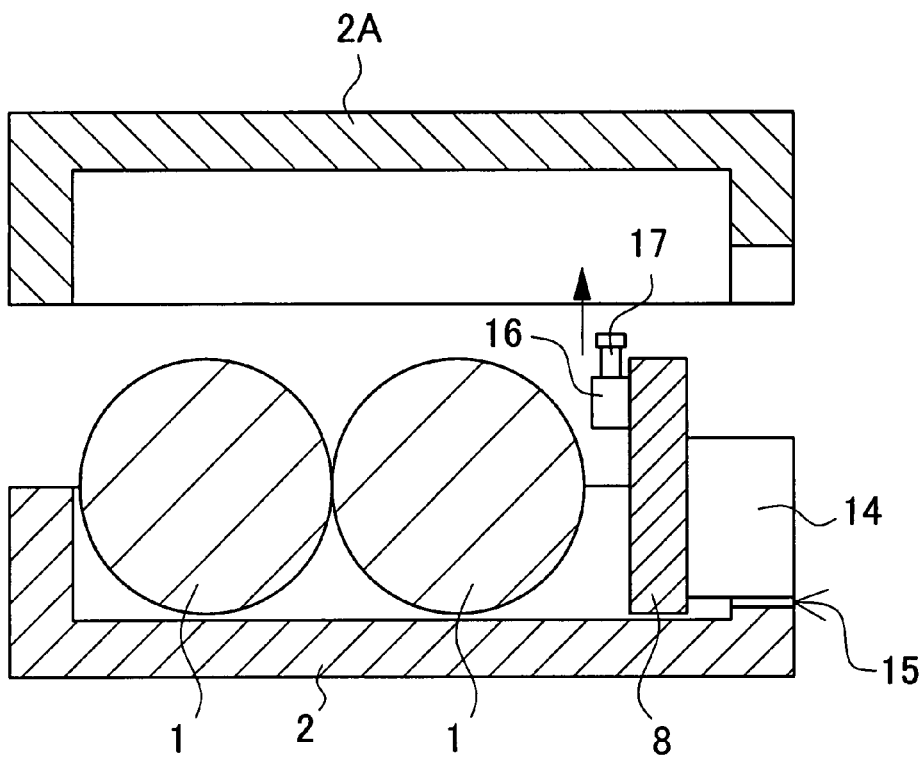
FIG. 5 is an abbreviated cross-sectional view showing the battery pack of FIG. 4 in a disassembled state.

However, as shown in FIGS. 4 and 5, the battery pack of the present invention can also detect disassembly with a disassembly detection switch 16, such as a limit switch or a micro-switch, with contacts that are physically switched on to off by case disassembly. The limit switch or micro-switch disassembly detection switch 16 of this battery pack is positioned with its plunger 17 disposed where it is pressed upon by the case 2. Specifically, as shown in FIG. 4, the disassembly detection switch 16 is positioned where the case cover 2A presses on the plunger 17 to turn the switch on in the assembled state, and as shown in FIG. 5, where the opened case cover 2A releases the plunger 17 to turn the switch off. The disassembly signal of this disassembly detection switch 16 is an off signal. However, by making the switch off when the case presses on the plunger, the disassembly signal can be made to be an on signal. A battery pack provided with a disassembly detection switch 16, such as a limit switch or a micro-switch, which switches electrical contacts on or off with case disassembly, can detect case disassembly with a structure that allows external light to shine in and does not require a case made of opaque material. In addition, since the contacts of the disassembly detection switch 16 output an on or off disassembly signal, it has the characteristic that electronic circuitry to detect case disassembly can be simplified.

Figure 6:
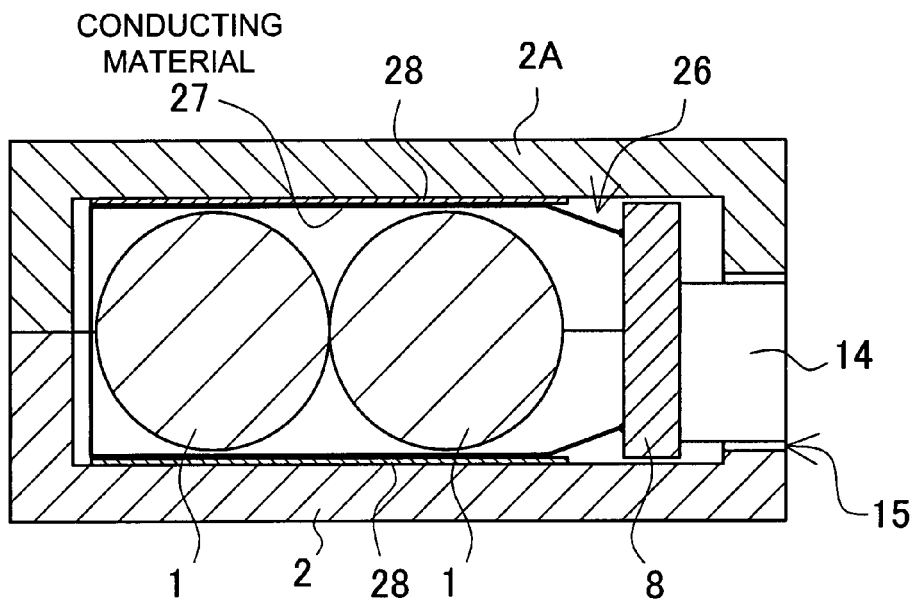
FIG. 6 is an abbreviated cross-sectional view of a battery pack related to another embodiment of the present invention.
Figure 7:
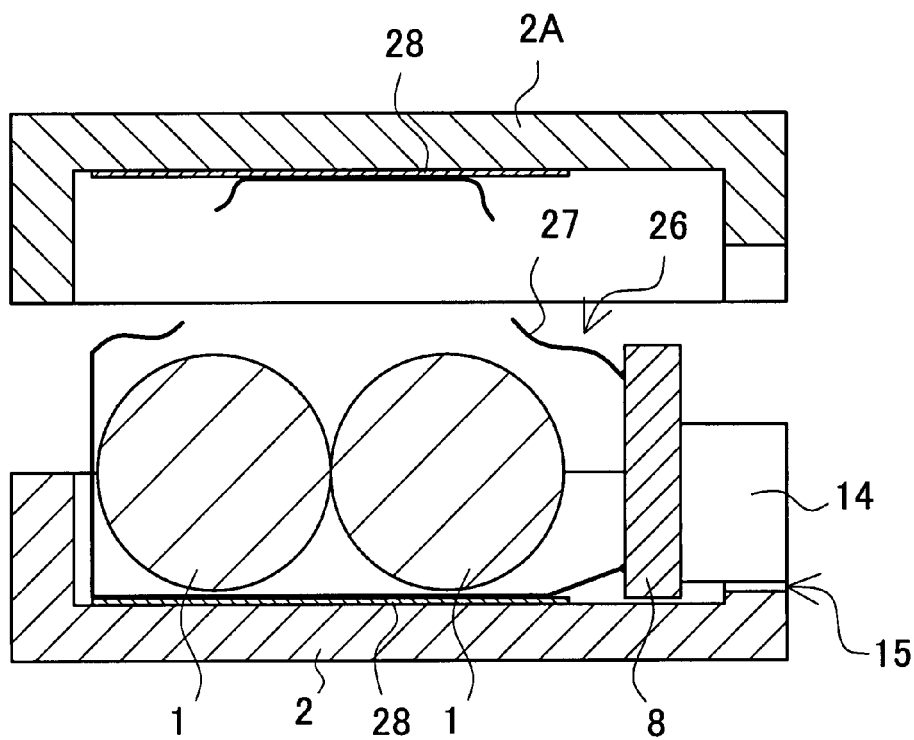
FIG. 7 is an abbreviated cross-sectional view showing the battery pack of FIG. 6 in a disassembled state.

As shown in FIGS. 6 and 7, the disassembly detection switch 26 of the battery pack of the present invention can also be conducting material 27 attached to the inside surfaces of the case 2. The case disassembly can be detected by detecting an open circuit in the conducting material 27. In the battery pack shown in FIG. 6, wire, which is the conducting material 27, is disposed around the batteries 1 between the batteries 1 and the case 2, and both ends of the wire are connected to the circuit board 8. However, the conducting material does not necessarily have to be disposed around the batteries, and it can be disposed in any location where it will be broken when the case is disassembled. The conducting material can also be thin metal foil or a conducting label. In the battery pack shown in the figures, attachment material 28 is disposed on the inside surfaces of the case 2 to attach the conducting material 27 to the inside surfaces of the case 2. The attachment material 28 shown in the figures is double-sided tape. However, the conducting material can also be directly attached to the inside surfaces of the case with materials such as adhesive bond.

In this battery pack, the case 2 is closed with wire, which is the conducting material 27, disposed inside the case 2, around the batteries 1, and connected to the circuit board 8. Wire is attached to attachment material 27 provided on the inside surfaces of the case 2. The length of the wire is such that a breaking force is applied to the wire when the case 2 is opened. For example, if the length is such that the wire follows along the inside surfaces of the case 2, a force that breaks the wire can be applied if the case 2 is disassembled by external force. Although the wire, which is the conducting material 27, should break from external force applied when the case 2 is disassembled, wire material should be used that has sufficient strength not to break due to mechanical shock such as when the battery pack is dropped. As shown in FIG. 7, when the case 2 of a battery pack with this structure is disassembled, the wire attached to the inside of the case cover 2A is forcibly pulled apart and broken. Here, the control circuit detects failure of the conducting material 27 to conduct as the disassembly signal. This battery pack can also detect case disassembly with a structure that allows external light to shine in and does not require a case 2 made of opaque material. In addition, it has the characteristic that electronic circuitry to detect case disassembly can be simplified.

The control circuit 7 detects the disassembly signal from the disassembly detection switch and puts the battery pack in an unusable state. The control circuit 7 turns the charging switch 3 off to disable battery charging, or it turns the discharge switch 4 off to make discharge impossible, or it blows the fuse 5 to disable both charging and discharging. Preferably, when the control circuit 7 detects a disassembly detection switch disassembly signal, it turns the charging switch 3 off, it turns the discharge switch 4 off, and it blows the fuse 5 to put the battery pack in an unusable state. However, when the control circuit 7 detects a disassembly signal, it can also put the battery pack in an unusable state by turning off either the charging switch 3 or the discharge switch 4, or it can blow the fuse 5 without turning either the charging or discharge switch off.

Further, the control circuit 7 is provided with memory 13, such as electrically erasable and programmable read-only memory (EEPROM), to store the disassembly signal issued from the disassembly detection switch 6. This battery pack can save a record of case disassembly from the disassembly signal stored in memory 13. This battery pack can determine whether the user has disassembled the case 2 from disassembly signal contents in memory 13.

The battery pack shown in FIGS. 8-11 is provided with a current cut-off device 50 connected in series with the batteries 31, a plurality of unit cases 32 housing batteries 31 that are charged and discharged through the current cut-off device 50, a disassembly detection switch 36 that detects unit case disassembly and issues a disassembly signal, and a control circuit 37 that cuts-off the current cut-off device 50 to shut-off current flowing through the batteries 31 given a disassembly signal from the disassembly detection switch 36. The battery pack has a pair of unit cases, which are the first unit case 32A and the second unit case 32B, joined together. However, the battery pack of the present invention can also be three or more unit cases joined together.

Each unit case 32 houses batteries 31 and a circuit board 38. In the battery pack, each unit case 32 houses three circular cylindrical batteries connected in parallel. However, in the battery pack of the present invention, a unit case can also house two batteries or four or more batteries. Further, the batteries contained inside a unit case can be connected in series or in parallel. The batteries 31 are lithium ion rechargeable batteries. However, the batteries can be any batteries that can be charged such as nickel hydrogen batteries or nickel cadmium batteries.

Figure 8:
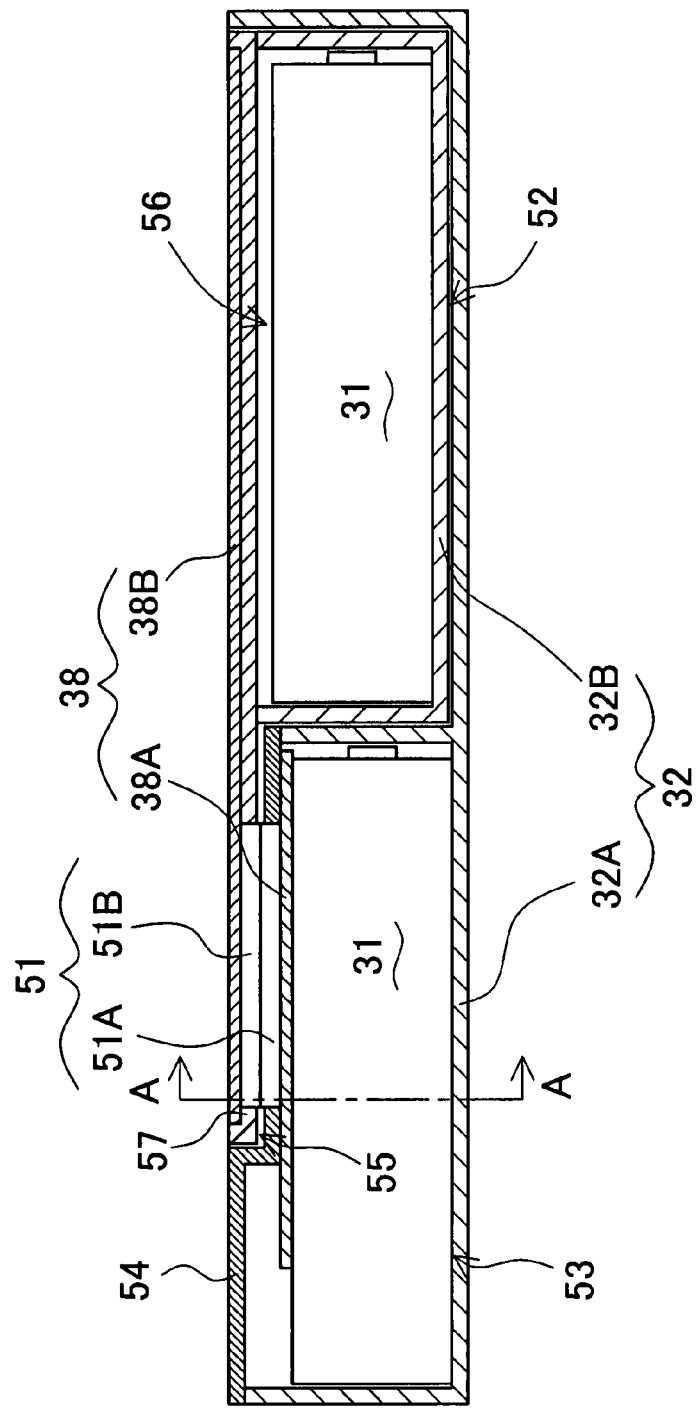
FIG. 8 is an abbreviated cross-sectional view of a battery pack related to another embodiment of the present invention.
Figure 9:
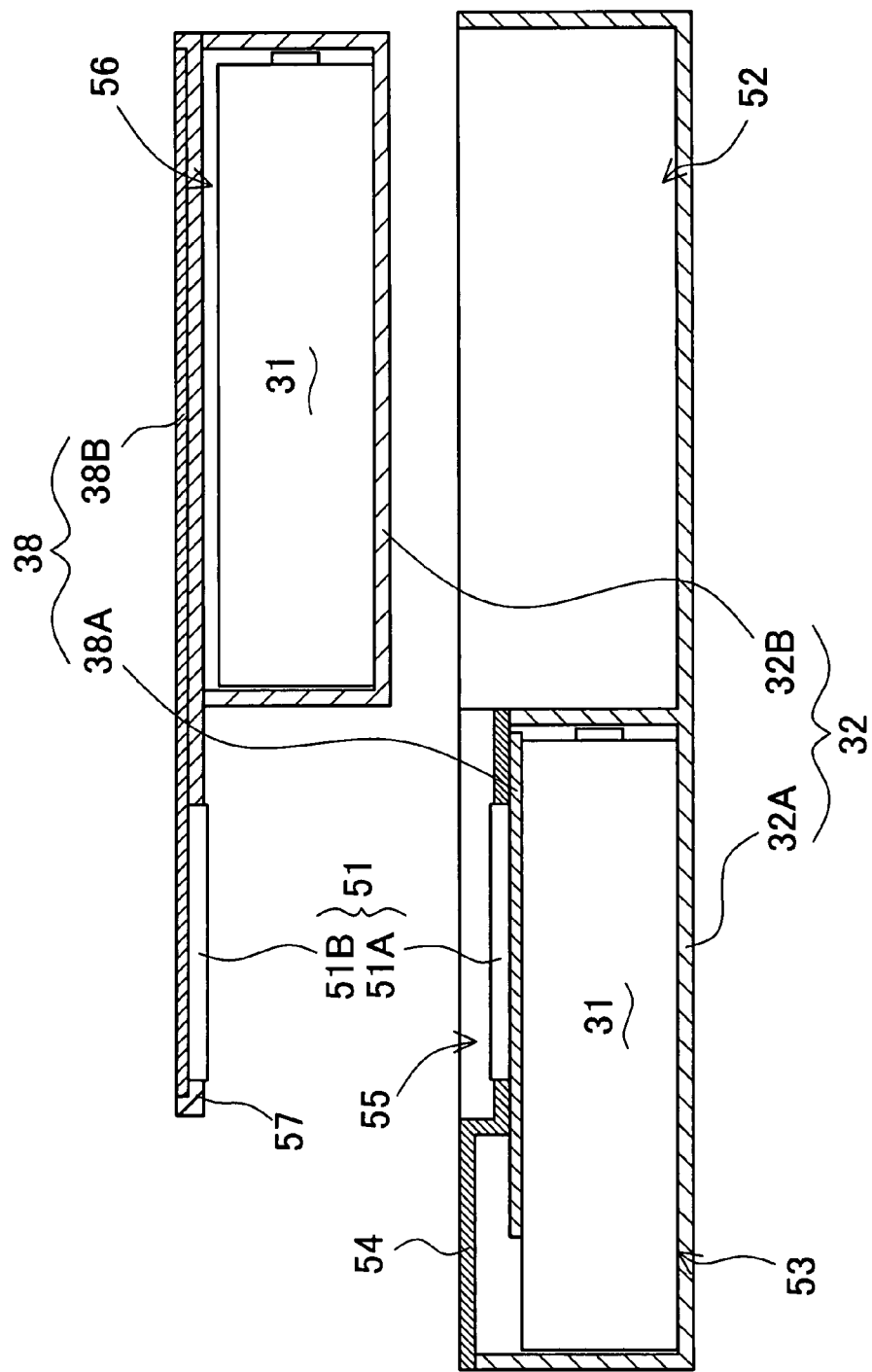
FIG. 9 is an exploded cross-sectional view showing the battery pack of FIG. 8 in a disassembled state.
Figure 10:
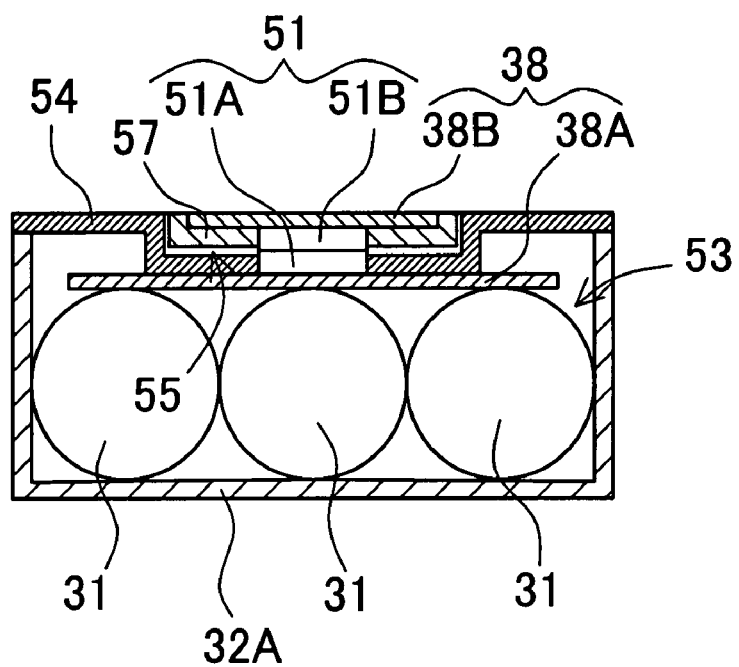
FIG. 10 is a cross-sectional view across the line A-A of the battery pack shown in FIG. 8.

The battery pack of FIGS. 8-11 is assembled by joining the first unit case 32A and the second unit case 32B. The first unit case 32A and the second unit case 32B are fabricated by plastic molding. However, the unit cases can also be manufactured of sheet metal. The first unit case 32A is approximately a flat box shape and is provided with a closed compartment structured to hold three batteries 31 and a circuit board 38A. It is also provided with an open top compartment 52 (an approximately rectangular solid space) to hold the second unit case 32B. In FIGS. 8 and 9, the first unit case 32A is provided with the open top compartment 52 on the right half, and with the closed compartment 53 holding three batteries 31 on the left half. Cover material 54 is attached to close off the open top of the first unit case 32A with the batteries 31 and circuit board 38A inside the closed compartment 53.

The second unit case 32B has an external shape that allows it to fit in the open top compartment 52 of the first unit case 32A. In the present embodiment, the second unit case 32B has an approximately flat box shape. The second unit case 32B is also provided with a closed internal compartment 56, and three batteries 31 are housed in that compartment 56. These batteries 31 are connected in parallel. The battery pack is assembled by attaching the second unit case 32B inside the open top compartment 52 of the first unit case 32A. The first unit case 32A and the second unit case 32B are joined and fixed in place by a snap-in structure or are screwed together.

When the second unit case 32B is fixed in place in the open top compartment 52 of the first unit case 32A, the first and second unit cases 32A, 32B are connected by connectors 51. The second unit case 32B is provided with a connector section 57 that holds a connector 51B and extends outward to mate with the first unit case 32A. The first unit case 32A is provided with a cavity 55 on the upper surface of the cover material 54 to accept the connector section 57 of the second unit case 32B. The second unit case 32B has its connector 51B fixed to the connector section 57, and the first unit case 32A has its connector 51A fixed in the cavity 55 that mates with the connector section 57. The pair of connectors 51A, 51B, provided on the connector section 57 and in the cavity 55, are connected together when the second unit case 32B is fit into, and is joined with the open top compartment of the first unit case 32A.

The connectors 51 connect the batteries 31 housed in the first unit case 32A in series with the batteries 31 housed in the second unit case 32B. The connectors 51 of FIG. 11 connect the batteries 31 housed in the first and second unit cases 32A, 32B in series via a plurality of contacts 60. This structure can connect the batteries 31 in series in a stable fashion, and can reduce contact resistance in the connectors 51.

Figure 11:
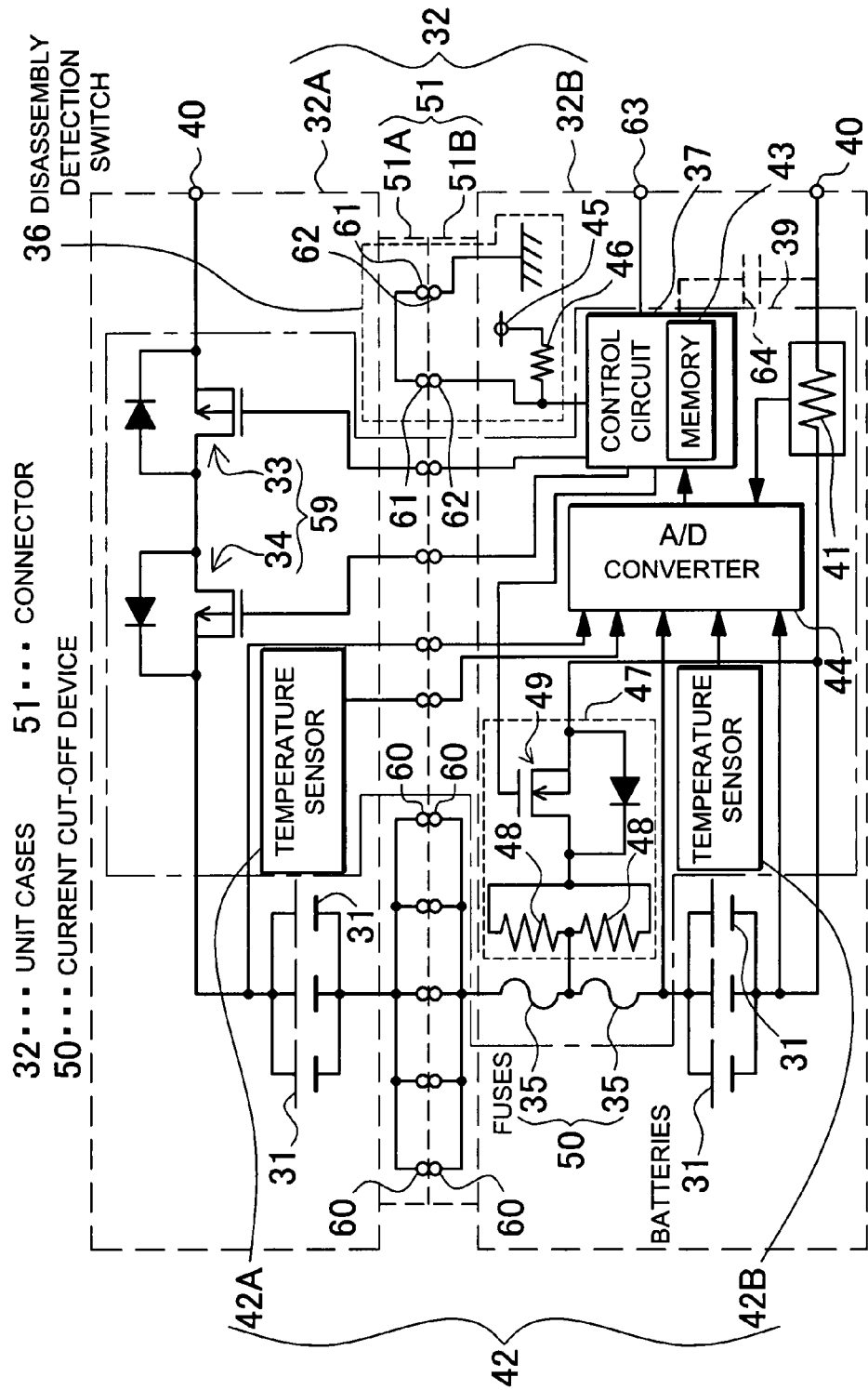
FIG. 11 is a circuit diagram of the battery pack shown in FIG. 8.

FIG. 11 shows a circuit diagram of the battery pack. The battery pack has three batteries 31 each connected in parallel and housed in the first unit case 32A and the second unit case 32B, and those two battery groups are connected in series via the current cut-off device 50. Specifically, the battery pack has six batteries 31 connected as two groups of three parallel-connected batteries 31 connected in series. The circuit board 38 housed in the second unit case 32B is provided with fuses 35, which are the current cut-off device 50, and a control circuit 37.

In this battery pack, the circuit board 38 also holds the protection circuit 39 for the batteries 31. The protection circuit 39 is provided with a charging switch 33 to control charging current, a discharge switch 34 to control discharging current, fuses 35, which are the current cut-off device 50, to fuse open for excessive current and unit case disassembly, and a control circuit 37 to control the charging switch 33 and discharge switch 34 on and off as well as to fuse open the fuses 35 for excessive current.

In the battery pack of FIG. 11, the charging switch 33, discharge switch 34, and temperature sensor 42A are mounted on the circuit board 38A contained in the first unit case 32A. The fuses 35 of the current cut-off device 50, control circuit 37, and temperature sensor 42B are mounted on the circuit board 38B contained in the second unit case 32B. The temperature sensor 42A is disposed in close proximity to, and thermally joined to the batteries 31 in the upper half of FIG. 11. The temperature sensor 42B is disposed in close proximity to, and thermally joined to the batteries 31 in the lower half of FIG. 11. As a result, the control circuit 37 detects temperature via two temperature sensors 42A, 42B, and implements control as described below. If battery temperature becomes greater than a specified temperature, the control circuit 37 turns the charging switch 33 off to terminate charging if the batteries 31 are being charged, or the control circuit 37 turns the discharge switch 34 off to terminate discharging if the batteries 31 are being discharged. In this case, the control circuit 37 uses the highest temperature from the two temperature sensors 42A, 42B to execute termination. If battery temperature becomes less than or equal to a specified temperature, the control circuit 37 turns the charging switch 33 off to terminate charging if the batteries 31 are being charged, or the control circuit 37 turns the discharge switch 34 off to terminate discharging if the batteries 31 are being discharged. In this case, the control circuit 37 uses the lowest temperature from the two temperature sensors 42A, 42B to execute termination. Further, when the control circuit 37 uses various data that depend on battery temperature (for example, discharge efficiency, charging efficiency, and temperature dependent specified voltage when specified remaining capacity [for example, 3%] is corrected at the specified voltage), it computes an average temperature value from the two temperature sensors 42A, 42B to use for control.

The charging switch 33 and discharge switch 34 are connected in series between the positive electrodes of the batteries 31 and the positive output terminal 40 of the first unit case 32A. The charging switch 33 and the discharge switch 34 are switching devices 59. The switching devices 59 are FETs. However, any device that a control circuit signal can switch on and off, such as a semiconductor switching device, for example a bipolar transistor, or a relay can be used as the switching devices, which are the charging switch and the discharge switch.

The fuses 35 are connected in series with the batteries 31, are fused open by excessive current, and in addition are forcibly blown by a signal from the control circuit 37. The protection circuit 39 is provided with a cut-off circuit 47 to forcibly blow the fuses 35. The cut-off circuit 47 is provided with heating resistors 48 to heat and blow the fuses 35, and a switching device 49 to control conduction through the heating resistors 48. The heating resistors 48 of the cut-off circuit 47 are disposed in close proximity to, and thermally joined to the fuses 35. A switching device 49, such as a FET, is connected in series with the heating resistors 48 and is controlled on and off by the control circuit 37. The cut-off circuit 47, which is comprised of the heating resistors 48 and switching device 49, is connected between the positive and negative-sides of the batteries 31 in the second unit case 32B, and the gate signal on the FET, which is the switching device 49, is controlled by the control circuit 37. If the control circuit 37 puts the switching device 49 in the on state, current flows from the batteries 31 of the second unit case 32B to the heating resistors 48. As a result, the heating resistors 48 generate heat by Joule heating to blow the fuses 35. By this action, the battery pack can be made unusable from that time.

When the batteries 31 reach full charge, the charging switch 33 is switched from on to off to prevent battery overcharging. Similarly, when batteries 31 completely discharge to a specified level, the discharge switch 34 is turned off to prevent battery over-discharge. Full charge and complete discharge of the batteries 31 is detected by the control circuit 37. Consequently, the control circuit 37 detects battery current and voltage to compute remaining battery capacity. The protection circuit 39 is provided with a current detection resistor 41 connected in series with the batteries 31 to detect battery current. Voltage across the terminals of this current detection resistor 41 is measured to determine charging current and discharging current flowing through the batteries 31. An analog-to-digital (A/D) converter 44 is used to convert the analog values of various data to digital values input to the control circuit 37.

The battery pack is provided with temperature sensors 42 to detect battery temperature. The temperature sensors 42 are thermistors in close proximity to, and thermally joined to the batteries 31. Temperature sensors 42 change electrical resistance with battery 31 temperature to detect battery temperature. If battery temperature detected by the temperature sensors 42 becomes greater than a specified temperature, the control circuit 37 turns the charging switch 33 off to terminate charging if the batteries 31 are being charged, or the control circuit 37 turns the discharge switch 34 off to terminate discharging if the batteries 31 are being discharged. If battery temperature becomes abnormally high, the fuses 35 are blown to terminate charging and discharging.

Further, the battery pack has a disassembly detection switch 36, which is made up of the connectors 51 that connect unit cases 32, and which detects disassembly of the first and second unit cases 32A, 32B. If the unit cases 32 become disassembled and the second unit case 32B becomes separated from the first unit case 32A, the connectors 51 become separated and the disassembly detection switch 36 is switched off. The battery pack of FIG. 11 is provided with a pair of short-circuit contacts 61 in the connector 51A of the first unit case 32A. The short-circuit contacts 61 are internally connected as a short circuit. The pair of short-circuit contacts 61 connect with detection contacts 62 in the connector 51B of the second unit case 32B. This configuration of the disassembly detection switch 36 is in the on state when the first unit case 32A and the second unit case 32B are connected and the detection contacts 62 are short circuited by the short-circuit contacts 61. If the unit cases 32 are disassembled, the detection contacts 62 become separated from the short-circuit contacts 61. With the detection contacts 62 no longer short circuited the disassembly detection switch 36 switches off. Consequently, the disassembly detection switch 36, which is made up of the connectors 51, issues an off signal as the disassembly signal when the unit cases 32 are disassembled. An on signal is output when the unit cases 32 are in the assembled state. For example, disassembly can be detected as follows. As shown in FIG. 11, a separate power supply 45 is provided via a resistor 46 to supply power at a node between the control circuit 37 and the short-circuit contacts 61. Since the detection contacts 62 are short circuited by the short-circuit contacts 61 when the first unit case 32A is joined with the second unit case 32B and the connectors 51A, 51B are connected, 0V is input to the control circuit 37. However, if the first unit case 32A is disassembled from the second unit case 32B and the connectors 51A, 51B become disconnected, the detection contacts 62 are no longer short circuited and the power supply 45 voltage is input to the control circuit 37. As a result, the control circuit 37 can detect disassembly by detecting the supply voltage as the disassembly signal.

Figure 12:
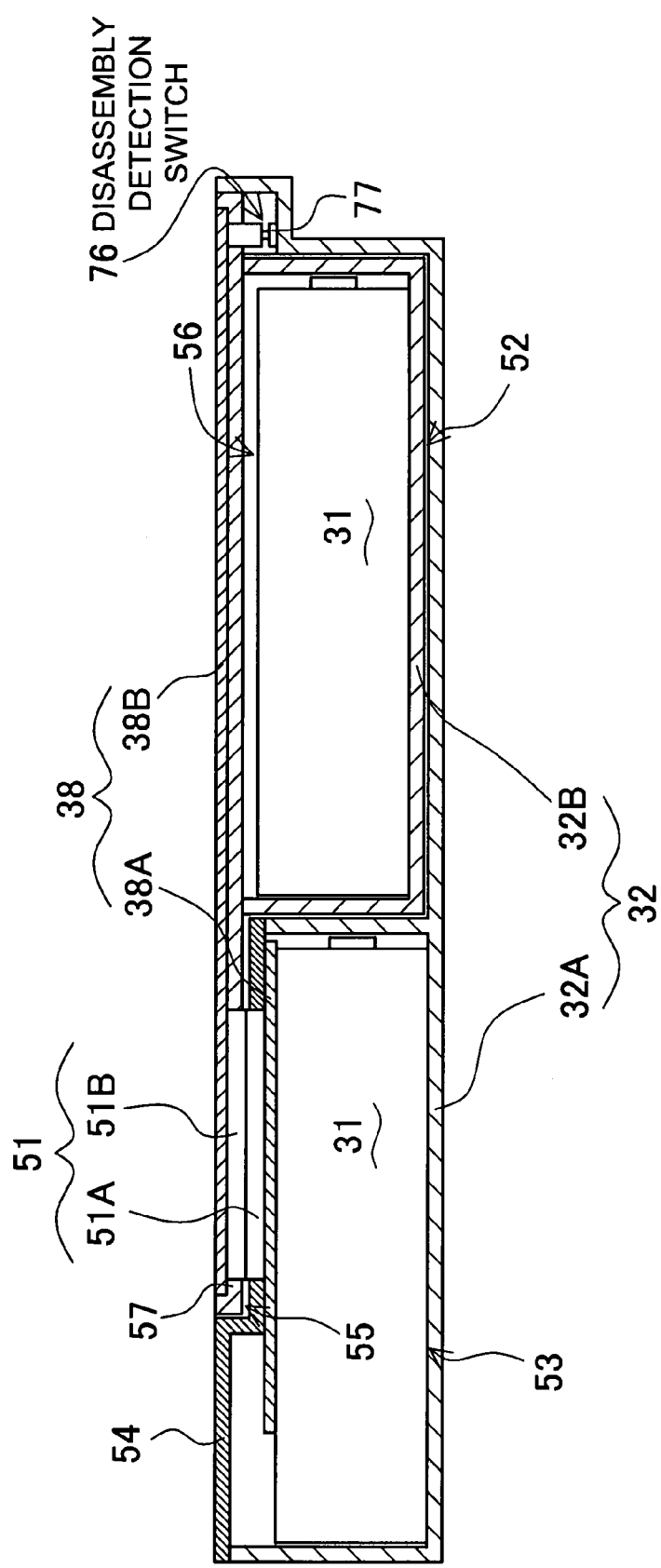
FIG. 12 is an abbreviated cross-sectional view of a battery pack related to another embodiment of the present invention.
Figure 13:
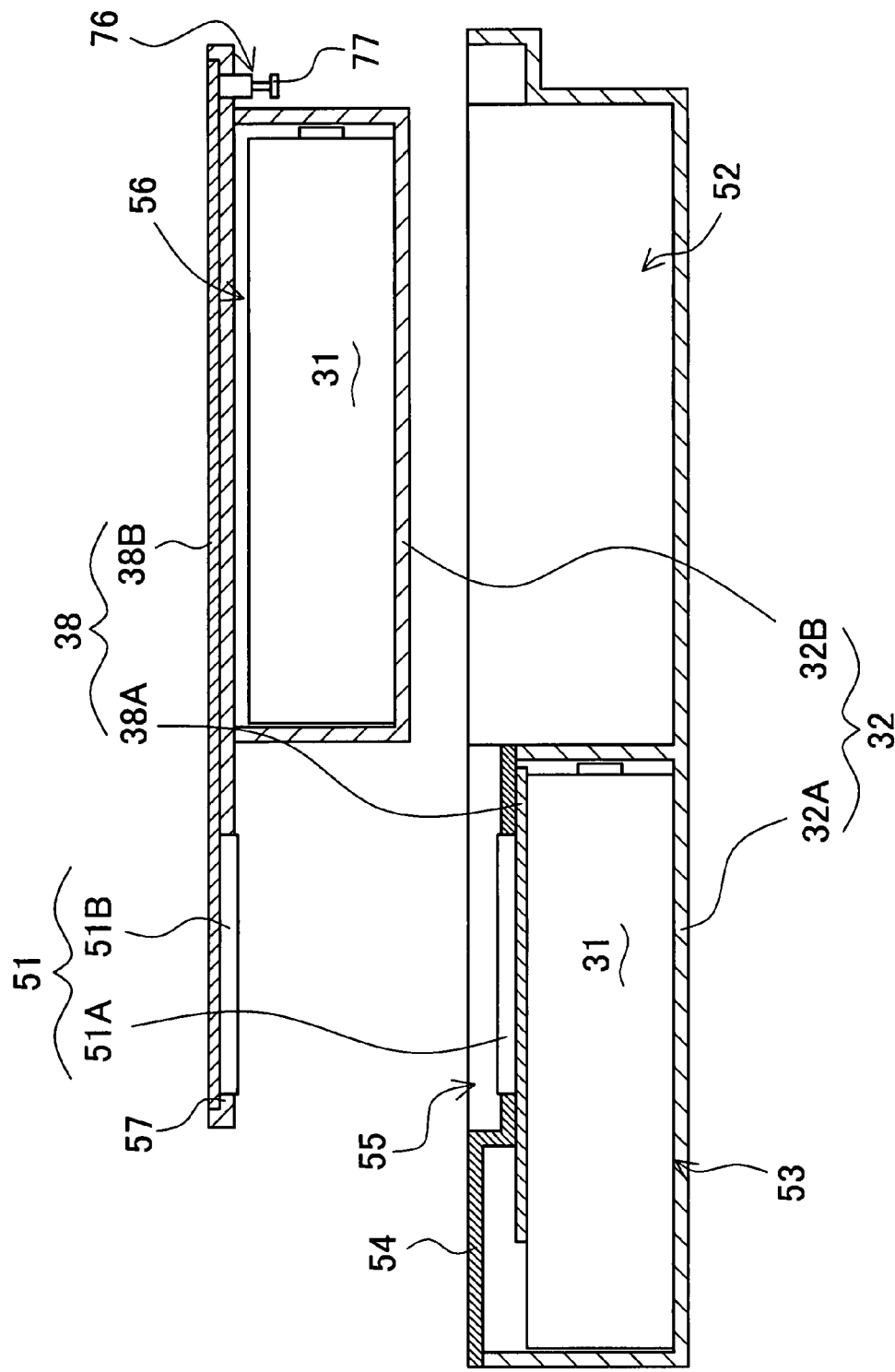
FIG. 13 is an exploded cross-sectional view showing the battery pack of FIG. 12 in a disassembled state.

However, as shown in FIGS. 12 and 13, the battery pack of the present invention can also detect disassembly of the unit cases 32 with a disassembly detection switch 76, such as a limit switch or a micro-switch, with contacts that are physically switched on to off by unit case disassembly. The limit switch or micro-switch disassembly detection switch 76 of this battery pack is positioned with its plunger 77 disposed where it is pressed upon by a unit case 32. Specifically, as shown in FIG. 12, the disassembly detection switch 76 is positioned where a unit case 32 presses on the plunger 77 to turn the switch on with the unit cases 32 in the assembled state. As shown in FIG. 13, if the unit cases 32 are disassembled and the plunger 77 is released, the disassembly detection switch 76 is switched off. The disassembly signal of this disassembly detection switch 76 is an off signal. However, by making the switch off when a unit case 32 presses on the plunger, the disassembly signal can be made to be an on signal. A battery pack provided with a disassembly detection switch 76, such as a limit switch or a micro-switch, which switches electrical contacts on or off with unit case disassembly, can detect unit case disassembly with a structure that allows external light to shine in and does not require unit cases 32 made of opaque material. In addition, since the contacts of the disassembly detection switch 76 output an on or off disassembly signal, it has the characteristic that electronic circuitry to detect disassembly of the unit cases 32 can be simplified.

When the control circuit 37 detects a disassembly signal from the disassembly detection switch 36, it controls the current cut-off device 50 to cut-off current flow in the batteries 31. The current cut-off device 50 comprises fuses 35 that can be blown by the control circuit 37. When the control circuit 37 detects a disassembly signal from the disassembly detection switch 36, it turns on the switching device 49 of the cut-off circuit 47 described above to blow the fuses 35 and make the battery pack unusable.

However, in the battery pack of the present invention, the charging switch and discharge switch, which are switching devices controlled on and off by the control circuit, can act as the current cut-off device. Although not illustrated, the charging switch and discharge switch of this battery pack can be implemented by mounting them on a circuit board with a control circuit. For example, the charging switch and discharge switch can be connected to the positive-side or the negative-side of the batteries disposed in the second unit case, and controlled on and off by a control circuit. When the control circuit of this battery pack detects a disassembly signal from the disassembly detection switch, it disables charging by turning the charging switch off or it disables discharging by turning the discharge switch off putting the battery pack in an unusable state. Preferably, when the control circuit detects a disassembly signal from the disassembly detection switch, it can turn the charging switch off, turn the discharge switch off, and blow the fuses to put the battery pack in an unusable state. However, the control circuit can also turn off either one of the switching devices, namely the charging switch or the discharge switch, and blow the fuses to put the battery pack in an unusable state upon detection of a disassembly signal.

The control circuit 37 can also be provided with memory 43. The memory 43 is read-write memory. For example, memory such as EEPROM can be used. A unique identification (ID) code is stored in this memory 43 as discrimination data. The unique ID stored in memory 43 is a cut-off ID to shut off the current cut-off device 50 given a disassembly signal output from the disassembly detection switch 36. When authorized disassembly of the unit cases 32 is necessary, for example, during manufacture or during authorized repair after manufacture, unit cases 32 can be disassembled without shutting off the current cut-off device 50, that is without blowing the fuses 35, by re-writing the cut-off ID to memory 43. During manufacture or repair, the cut-off ID in memory 43 can be re-written to a special code that avoids blowing the fuses 35 even if unit cases 32 are disassembled. Here, the special code written to memory 43 can represent a signal that is not the unique cut-off ID, which shuts off the current cut-off device 50 due to a disassembly signal from the disassembly detection switch 36. Alternatively, it can be a special signal that does not shut off the current cut-off device 50 regardless of detection of a disassembly signal from the disassembly detection switch 36. In this battery pack, the normal cut-off ID is re-written to memory after manufacture (prior to shipping) or after repair. Subsequently, if the user disassembles the unit cases 32, the switching device 49 will be controlled on to blow the fuses 35. Consequently, the unit cases 32 can be disassembled without blowing the fuses 35 during manufacture and repair by the maker, while the fuses 35 can be blown to disable the battery pack if the user disassembles the unit cases 32. In the example above, the cut-off ID in memory 43 was re-written to a special code during manufacture or repair to avoid blowing the fuses 35 even when the unit cases 32 were disassembled. In contrast, a code that is not the unique cut-off ID can be written to memory 43 to avoid blowing the fuses 35 during manufacture or repair, and subsequently it can be changed to a special code to blow the fuses 35 if the user disassembles the unit cases 32.

Input of the unique ID to memory 43 can be through test terminals 63 provided on the battery pack. However, the unique ID can also be input to memory 43 via an alternating current (AC) signal input at the output terminals 40. For example, as shown by broken lines in FIG. 11, a capacitor 64 can be connected between the negative-side output terminal 40 and the control circuit 37 to input the unique ID via an AC signal at the output terminals 40.

Further, the control circuit 37 can store the disassembly signal issued from the disassembly detection switch 36 in memory 43. This battery pack can save a record of unit case disassembly from the disassembly signal stored in memory 43. This battery pack can determine whether the user has disassembled the unit cases 32 from disassembly signal contents in memory 43.

Figure 14:
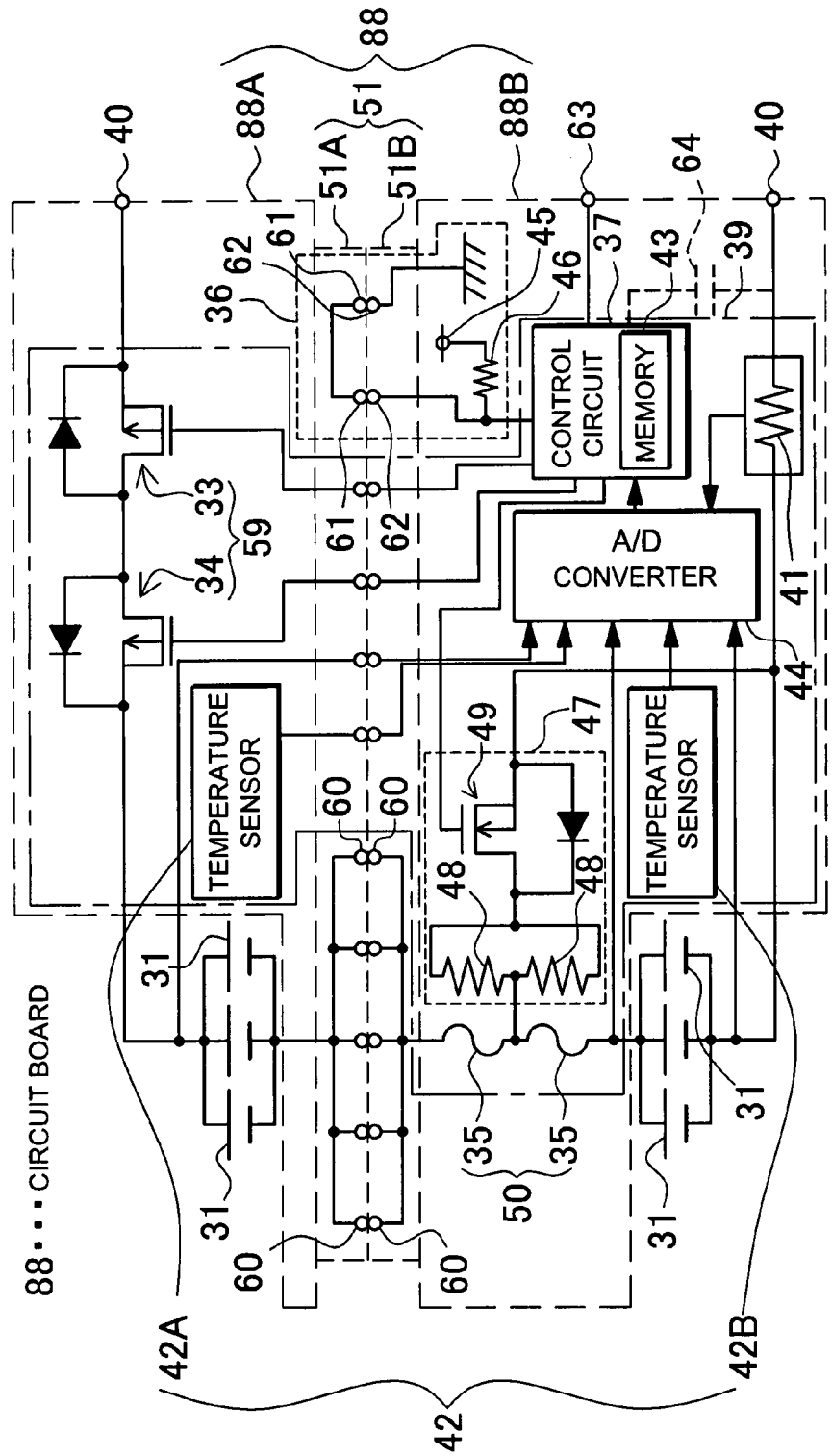
FIG. 14 is a circuit diagram of a battery pack related to another embodiment of the present invention.

The battery pack embodiment described above is configured to detect unit case disassembly via the disassembly detection switch 36. If the first unit case 32A and the second unit case 32B are disassembled, the control circuit 37 controls shut off of the current cut-off device 50. However, as shown in FIG. 14, the battery pack of the present invention can also be configured with a plurality of circuit boards 88 that are mutually interconnected. In this battery pack, the disassembly detection switch 36 can detect circuit board disassembly to shut off the current cut-off device 50. In FIG. 14, elements, which are the same as the previous embodiment, are labeled the same and their detailed description is abbreviated.

The battery pack shown in FIG. 14 has a first circuit board 88A and a second circuit board 88B joined via connectors 51. If the first circuit board 88A and second circuit board 88B are disassembled, the disassembly detection switch 36 detects that and issues a disassembly signal. As in the previous embodiment, connectors 51A, 51B, which are switched off if they are separated, can be used as the disassembly detection switch 36. Printed circuit boards, for example, can be used as the circuit boards 88. In this battery pack, if the interconnected circuit boards 88 are disassembled, the control circuit 37 shuts off the current cut-off device 50 due to a disassembly signal from the disassembly detection switch 36 forcing the battery pack into an unusable state. Consequently, this battery pack can also effectively prevent user modification that compromises battery safety.

Figure 15:
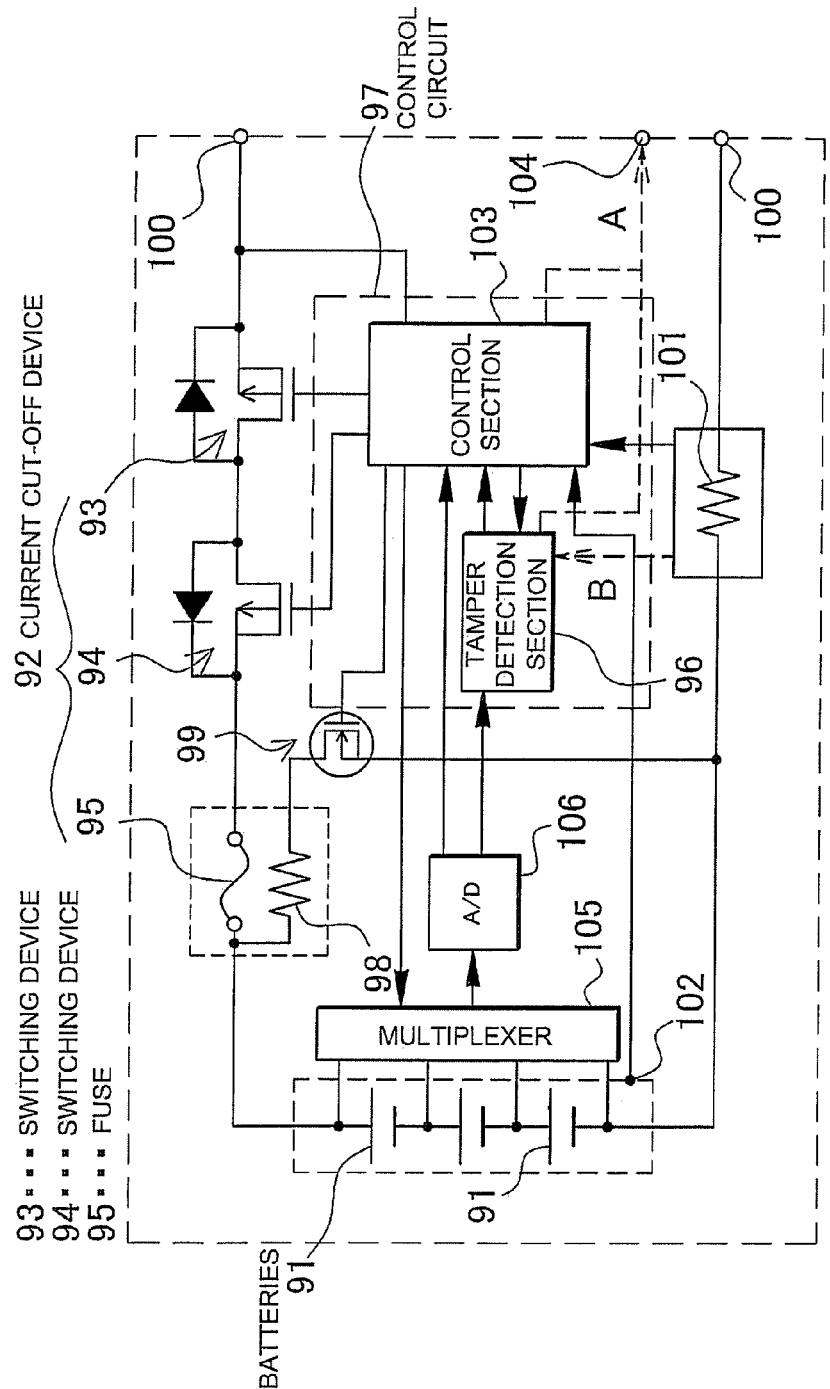
FIG. 15 is a circuit diagram of a battery pack related to another embodiment of the present invention.

The battery pack shown in FIG. 15 is provided with batteries 91, a current cut-off device 92 connected in series with the batteries 91, and a control circuit 97 for detecting battery replacement from a change in battery electrical characteristics and control the current cut-off device 92 on and off. The control circuit 97 is provided with a tamper detection section 96 to detect battery replacement and output a tamper signal, and a control section 103 to control the current cut-off device 92. The tamper detection section 96 functions due to execution of a program by a microprocessor, which is the control section 103 in the control circuit 97. The control section 103 detects a tamper signal from the tamper detection section 96 and controls the current cut-off device 92 off.

The batteries 91 are lithium ion rechargeable batteries. However, the batteries can also be nickel hydrogen batteries or nickel cadmium batteries. The battery pack contains a plurality of batteries 91. The plurality of batteries 91 is connected in series to increase battery pack output voltage. The plurality of batteries can also be connected in parallel, or in series and parallel.

In the battery pack of FIG. 15, either the fuse 95, charging switch 93, or discharge switch 94, or all three can serve an additional function as current cut-off device 92. Specifically, either the fuse 95, charging switch 93, or discharge switch 94, or all three are used as the current cut-off device 92. The fuse 95 is included in the battery pack to prevent excessive current from flowing in the batteries 91 and to prevent battery temperature from becoming abnormally high. Consequently, the fuse 95 is blown by excessive current, or when battery temperature becomes abnormally high. If the fuse 95 is blown open, battery current is cut-off, and the battery pack cannot be charged or discharged. Specifically, the battery pack becomes unusable. Consequently, this battery pack can be made unusable if battery replacement is detected and the fuse 95 is blown. In a battery pack with the fuse 95 serving the additional function of current cut-off device 92, it is not necessary to provide a special current cut-off device to disable the battery pack for unauthorized battery replacement. Although the battery pack in the present embodiment is made unusable when battery replacement occurs due to the current cut-off device 92, an alarm signal indicating battery replacement may instead be sent to connected electrical equipment. As shown by the broken line A of FIG. 15, abnormal battery replacement information can be output at an external terminal 104 and transmitted to electrical equipment, which is using the battery pack as a power source. In the battery pack, the alarm signal is sent by the tamper detection section 96, but it can also be sent by the control section 5.

The charging switch 93 or the discharge switch 94 can also serve the additional function of current cut-off device 92 to disable the battery pack when battery replacement is detected. The charging switch 93 is switched off to cut-off charging current when the batteries 91 reach full charge. The charging switch 93 is a switch to cut-off charging current and prevent over-charging of the batteries 91. When the charging switch 93 is in the state that cuts-off charging current, it does not cut-off discharge current. The discharge switch 94 is switched off to cut-off discharge current when the remaining capacity of discharging batteries 91 becomes low. The discharge switch 94 is a switch to cut-off discharge current and prevent over-discharge of the batteries 91. When the discharge switch 94 is in the state that cuts-off discharge current, it does not cut-off charging current.

Since the charging switch 93 disables battery pack charging when it is off and the discharge switch 94 disables discharging when it is off, the battery pack can be made unusable by maintaining these switching devices in the off state. As a result, the charging switch 93 or the discharge switch 94 can serve as the current cut-off device 92 to disable a battery pack that has had a battery 91 replaced. Since the charging switch 93 or the discharge switch 94 serve as the current cut-off device 92, it is not necessary to provide a special current cut-off device 92 to disable a battery pack with a replaced battery 91.

The battery pack of FIG. 15 is provided with a charging switch 93 to control charging, a discharge switch 94 to control discharging, a fuse 95 that is blown by excessive current, a control section 103 that controls the charging switch 93 and the discharge switch 94 on and off and blows the fuse 95 for over-current, and a tamper detection section 96 that is a tamper detector that detects battery replacement and issues a tamper signal. The charging switch 93, discharge switch 94, and fuse 95 are connected in series between the positive electrode of the batteries 91 and the positive-side output terminal 100. The charging switch 93 and discharge switch 94 are FET devices. However, any device that a control circuit signal can switch on and off, such as a semiconductor switching device, for example a bipolar transistor, or a relay can be used as the charging switch and the discharge switch.

The fuse 95 is fused open by excessive current, and in addition is forcibly blown by a signal from the control section 103. To forcibly blow the fuse 95, a heating resistor 98 is provided in close proximity to the fuse 95, and a switching device 99 is controlled by the control section 103 to pass current through the heating resistor 98. The control section 103 turns the switching device 99 on to pass current through the heating resistor 98, the heating resistor 98 generates heat by Joule heating, and the fuse 95 heats and fuses open. In the battery pack of FIG. 15, the fuse 95 is connected in series with the batteries 91 and a cut-off circuit to blow the fuse 95 is made up of the heating resistor 98, which is thermally joined to the fuse 95, and a switching device 99, such as a FET, connected in series with the heating resistor 98. The cut-off circuit is connected between the positive and negative-sides of the batteries 91, and the gate signal on the switching device 99 is controlled by the control section 103. If the control section 103 puts the switching device 99 in the on state, current flows from the batteries 91 through the heating resistor 98. As a result, the heating resistor 98 generates heat by Joule heating to blow the fuse 95. By this action, the battery pack can be made unusable from that time.

When the batteries 91 reach full charge, the charging switch 93 is switched from on to off to prevent battery overcharging. Similarly, when batteries 91 completely discharge, the discharge switch 94 is turned off to prevent battery overdischarge. The control section 103 detects battery current and voltage to compute remaining battery capacity. A current detection resistor 101 connected in series with the batteries 91 is provided to detect battery 91 current. Voltage across the terminals of this current detection resistor 101 is measured to determine charging current and discharging current flowing through the batteries 91.

The battery pack is also provided with a temperature sensor 102 to detect battery temperature. The temperature sensor 102 is a thermistor in close proximity to, and thermally joined to the batteries 91. The temperature sensor 102 changes electrical resistance with battery temperature to detect battery temperature. If battery temperature detected by the temperature sensor 102 becomes greater than a specified temperature, the control section 103 turns the charging switch 93 off to terminate charging if the batteries 91 are being charged, or the control section 103 turns the discharge switch 94 off to terminate discharging if the batteries 91 are being discharged. If battery temperature becomes abnormally high, the fuse 95 is blown to terminate charging and discharging.

The tamper detection section 96 detects battery replacement from a change in battery electrical characteristics, and issues a tamper signal when battery replacement is concluded. The battery pack of FIG. 15 contains a plurality of batteries 91. Electrical characteristics of each battery 91 can be detected by the tamper detection section 96, and battery replacement can be determined from the change in electrical characteristics of each battery 91. In the battery pack, a multiplexer 105 switches between the plurality of batteries 91 to detect the voltage of each battery 91 and input that voltage to an A/D converter 106. Voltages input to the A/D converter 106 are converted to digital signals and input to the tamper detection section 96. The multiplexer 105 switches between batteries 91 for input to the A/D converter 106 according to a synchronous signal from the control section 103. Digital battery voltage signals from the A/D converter 106 are also input to the control section 103 and used to compute remaining battery capacity.

Figure 16:
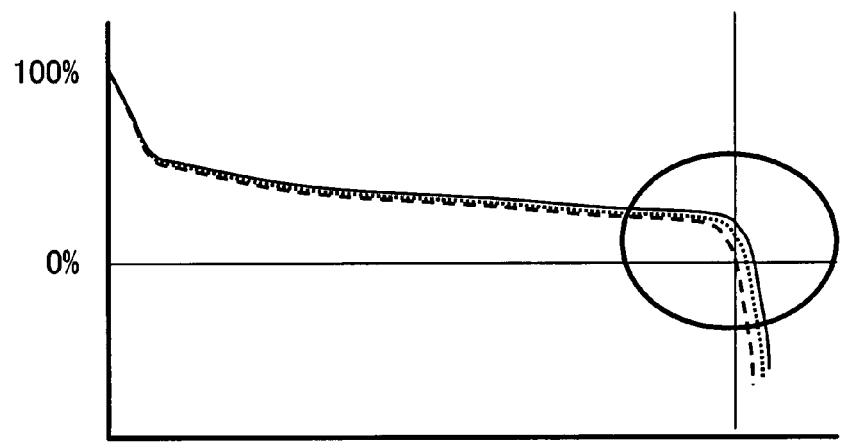
FIG. 16 is a graph showing the change in battery voltage for battery pack discharge.
Figure 17:
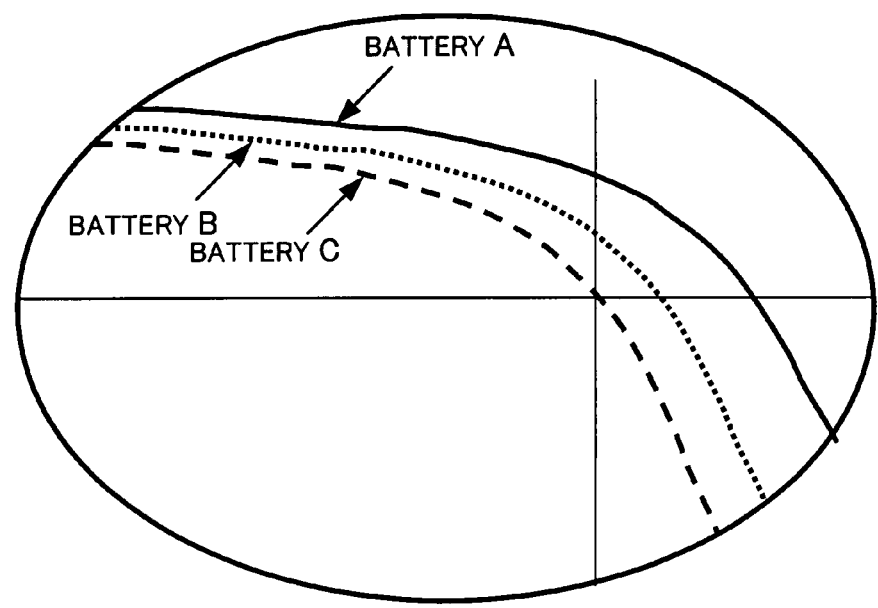
FIG. 17 is an enlarged view of one part of the graph shown in FIG. 16.

FIGS. 16 and 17 are graphs showing battery voltage change during battery pack discharge. These figures show battery voltage characteristic variation for three discharging batteries. The tamper detection section 96 detects discharge voltage for each battery 91 and can detect battery replacement from a change in discharge voltage for a battery 91, or from a change in the order of discharge voltages. As illustrated in FIG. 16 showing discharge voltage change over time, the tamper detection section 96 stores the battery order by voltage at the point where the voltage of the lowest voltage battery reaches a previously set minimum voltage. For example, in FIG. 17, the battery order by voltage is battery A, battery B, followed by battery C. Subsequently, if battery voltage is measured under the same conditions and the battery order by voltage has changed to something other than battery A, battery B, followed by battery C, battery replacement is concluded and a tamper signal is issued.

In addition, as illustrated in FIGS. 16 and 17 showing discharge voltage change over time, the tamper detection section 96 can store the voltage of each battery at the point where the voltage of the lowest voltage battery reaches a previously set minimum voltage. Subsequently, if battery voltages are again measured under the same conditions and any battery voltage has changed from its stored voltage value by more than specified limits, battery replacement is concluded and a tamper signal is issued.

Figure 18:
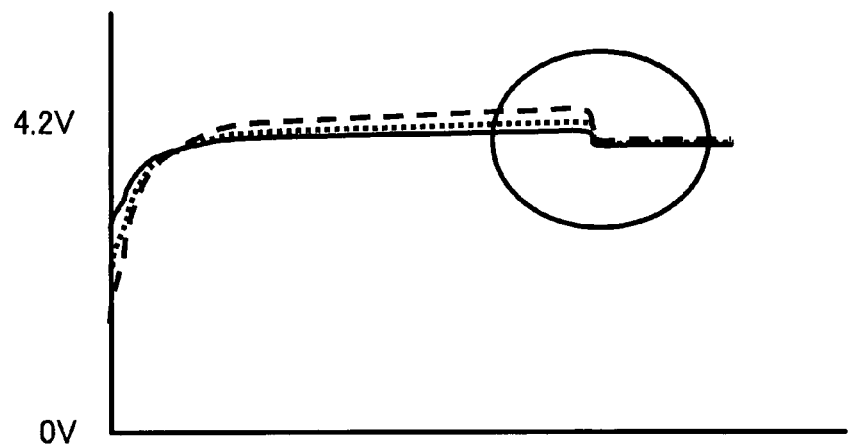
FIG. 18 is a graph showing the change in battery voltage for battery pack charging.
Figure 19:
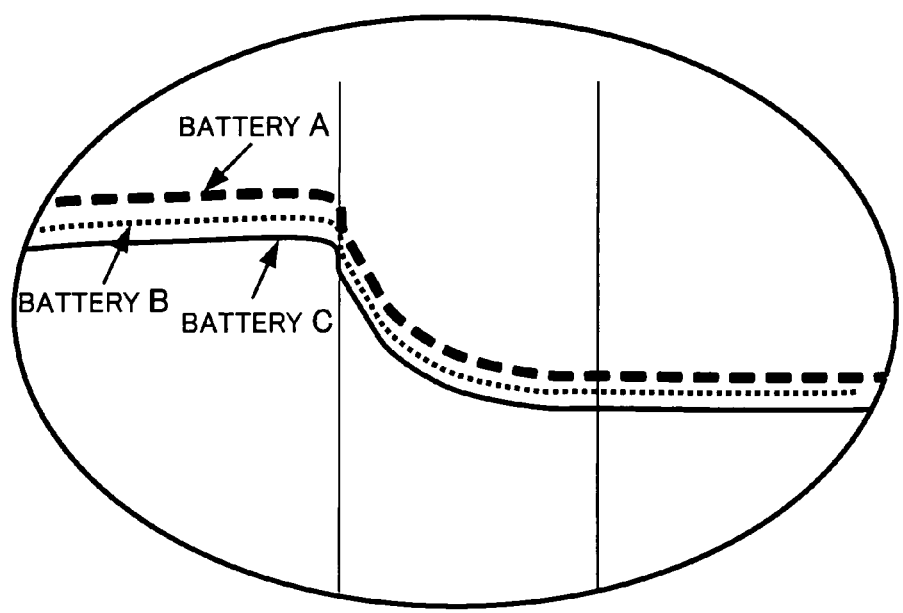
FIG. 19 is an enlarged view of one part of the graph shown in FIG. 18.

FIGS. 18 and 19 are graphs showing battery voltage change during battery pack charging. These figures show battery voltage characteristic variation for three batteries being charged. The tamper detection section 96 detects charging voltage for each battery 91 and can detect battery replacement from a change in charging voltage for a battery 91, or from a change in the order of charging voltages. As illustrated in FIG. 18 showing charging voltage change over time, the tamper detection section 96 stores the battery order by voltage at the point where full charge is reached. For example, in FIG. 19, the battery order by voltage is battery A, battery B, followed by battery C. Subsequently, if battery voltage is measured under the same conditions and the battery order by voltage has changed to something other than battery A, battery B, followed by battery C, battery replacement is concluded and a tamper signal is issued.

In addition, as illustrated in FIGS. 18 and 19 showing change in charging voltage over time, the tamper detection section 96 can store the voltage of each battery at the point where full charge is reached. Subsequently, if battery voltages are again measured under the same conditions and any battery voltage has changed from its stored voltage value by more than specified limits, battery replacement is concluded and a tamper signal is issued.

Further, after several minutes following full charge of the batteries 91, the tamper detection section 96 can detect the discharge voltage of each battery 91 and detect battery replacement from a change in battery discharge voltage or the order of battery discharge voltages. As shown in FIG. 19, the tamper detection section 96 stores battery order from the voltage detected for each battery 91, or it stores the voltage of each battery 91 at a point several minutes after full charge is reached ($2^{nd}$ vertical line of FIG. 19). Subsequently, if battery voltages are again measured under the same conditions and the battery order by voltage has changed or any battery voltage has changed from its stored voltage value by more than specified limits, battery replacement is concluded and a tamper signal is issued. As shown in FIG. 19, a battery with more degradation has large internal resistance and the voltage component due to that internal resistance increases during charging. When charging is stopped, that voltage component decreases and voltage also drops because batteries become chemically more stable than during charging.

Still further, the tamper detection section 96 can measure battery capacity and detect battery replacement from change in that capacity. This tamper detection section 96 detects battery discharge voltage and discharge current, and integrates those values to compute battery discharge capacity. As shown by the broken line B in FIG. 15, this tamper detection section 96 detects discharge current via the current detection resistor 101 connected in series with the batteries 91. For example, the tamper detection section 96 computes battery discharge capacity by integrating discharge capacity after complete discharge from full charge, or after battery voltage has dropped to a specified minimum value from full charge. Subsequently, if battery capacity is again measured under the same conditions and battery capacity has changed from its stored voltage value by more than specified limits, battery replacement is concluded and a tamper signal is issued. Other methods of measuring battery capacity, such as measuring charging capacity from 0% capacity to full charge capacity, can be used besides the method of computing discharge capacity described above.

Figure 20:
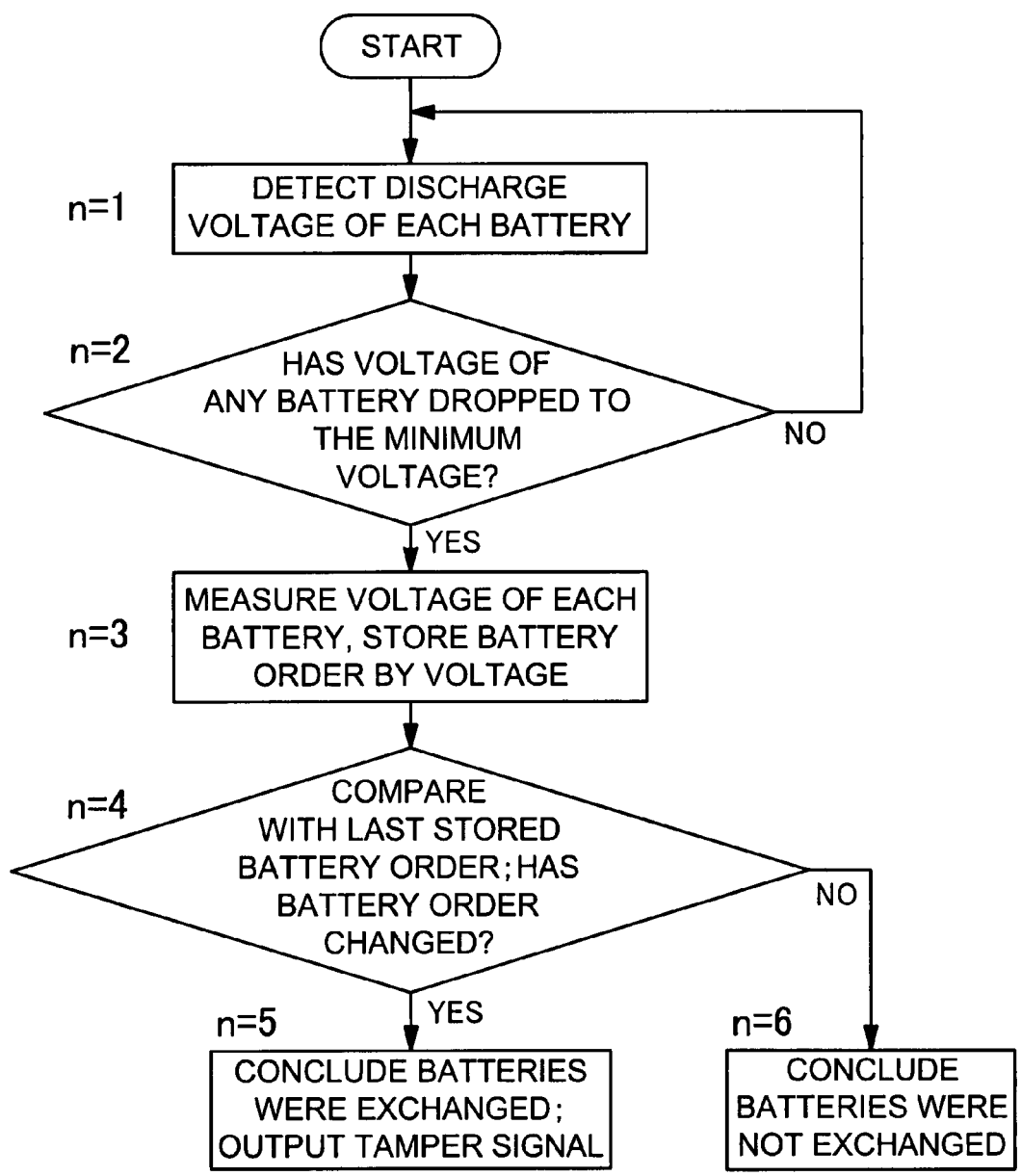
FIG. 20 is a flow chart for an embodiment of control circuit detection of battery replacement.

Flowcharts of FIGS. 20-26 show tamper detection section 96 detection of battery replacement from battery electrical characteristics. FIG. 20 is a flowchart for detection of battery replacement from the order of the discharge voltage for each battery. The tamper detection section detects battery replacement by the following steps.

[Steps n=1, 2]

Detect discharge voltage for each discharging battery, and determine if the lowest battery voltage has dropped to a previously set minimum voltage.

[Step n=3]

If any battery voltage has dropped to the previously set minimum voltage, measure the voltage of each battery, and store the battery order by voltage (for example, highest voltage batteries first).

[Steps n=4-6]

Compare the battery order with the last stored battery order and determine if the battery order by voltage has changed. If battery order has changed, conclude that batteries were exchanged and output a tamper signal. When battery order has not changed, conclude there was no battery exchange.

Figure 21:
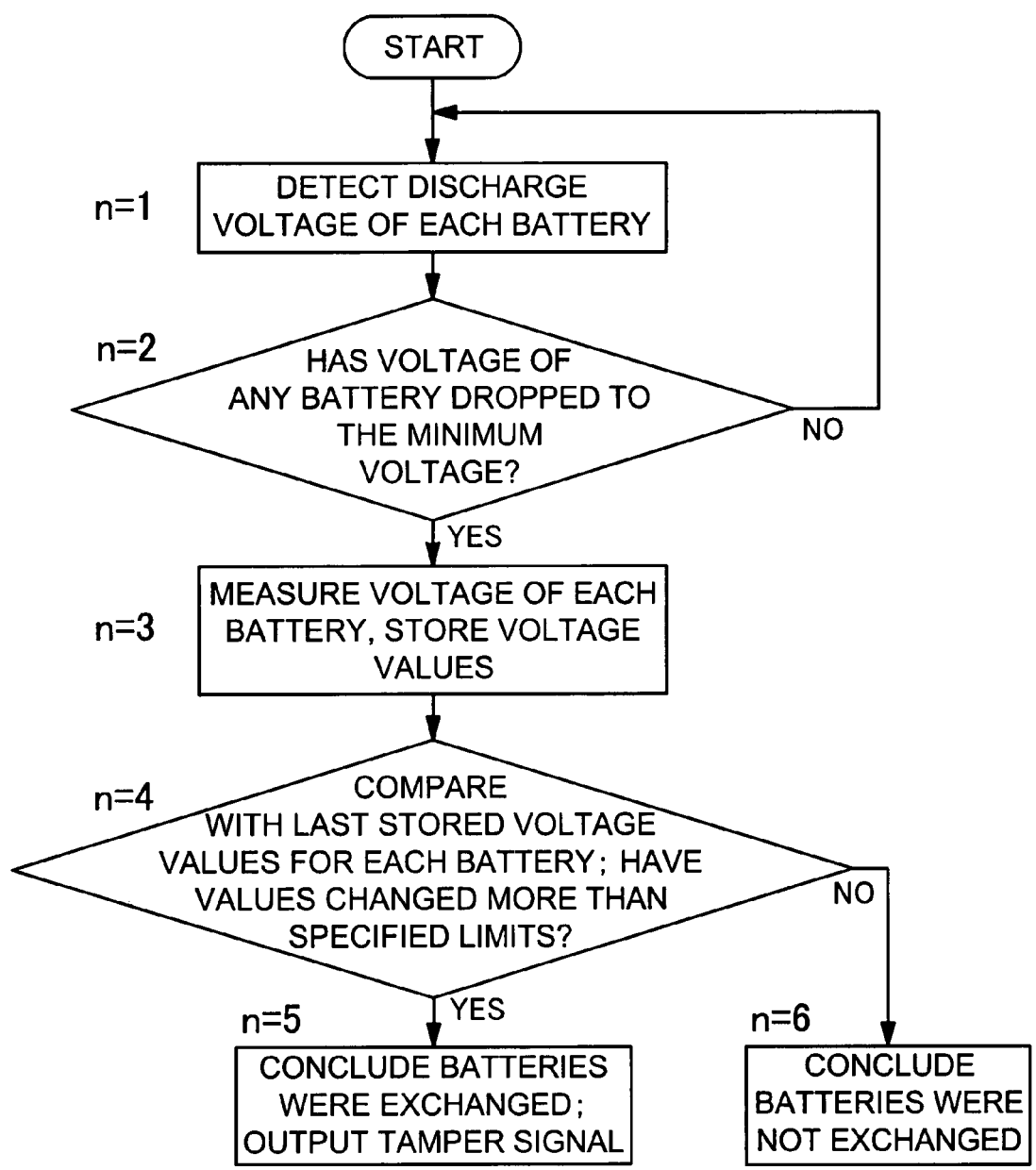
FIG. 21 is a flow chart for another embodiment of control circuit detection of battery replacement.

FIG. 21 is a flowchart for detection of battery replacement from the change in discharge voltage for each battery. The tamper detection section detects battery replacement by the following steps.

[Steps n=1, 2]

Detect discharge voltage for each discharging battery, and determine if the lowest battery voltage has dropped to a previously set minimum voltage.

[Step n=3]

If any battery voltage has dropped to the previously set minimum voltage, measure the voltage of each battery, and store those battery voltage values.

[Steps n=4-6]

Compare each battery voltage with the last stored voltage and determine if any battery voltage has changed more than specified limits. If any battery voltage has changed more than the specified limits, conclude that batteries were exchanged and output a tamper signal. When no battery voltage has changed more than the specified limits, conclude there was no battery exchange.

Figure 22:
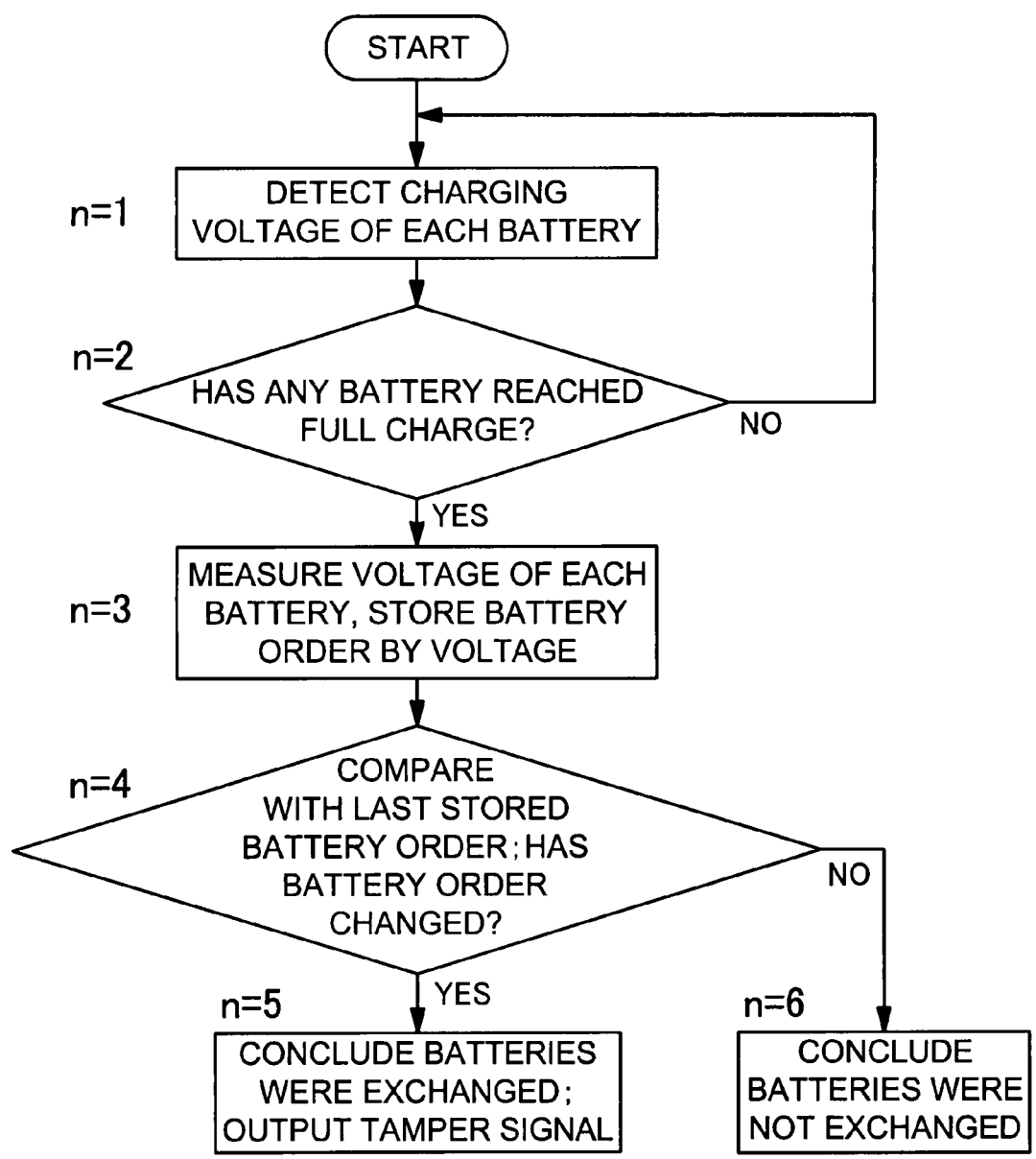
FIG. 22 is a flow chart for another embodiment of control circuit detection of battery replacement.

FIG. 22 is a flowchart for detection of battery replacement from the order of the charging voltage for each battery. The tamper detection section detects battery replacement by the following steps.

[Steps n=1, 2]

Detect charging voltage for each battery being charged, and determine if any battery has reached full charge.

[Step n=3]

If any battery has reached full charge, measure the voltage of each battery, and store the battery order by voltage (for example, highest voltage batteries first).

[Steps n=4-6]

Compare the battery order with the last stored battery order and determine if the battery order by voltage has changed. If battery order has changed, conclude that batteries were exchanged and output a tamper signal. When battery order has not changed, conclude there was no battery exchange.

Figure 23:
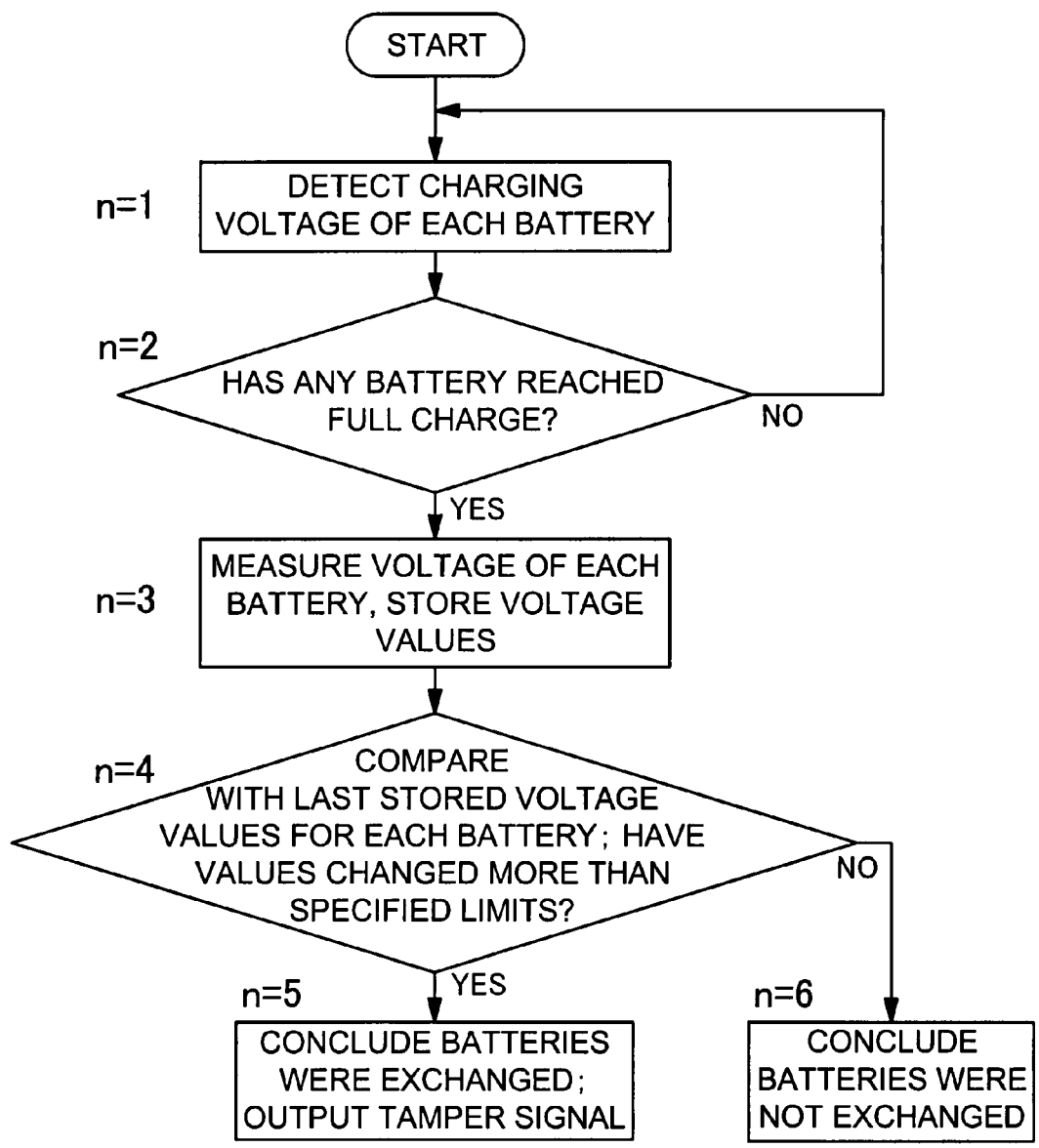
FIG. 23 is a flow chart for another embodiment of control circuit detection of battery replacement.

FIG. 23 is a flowchart for detection of battery replacement from the change in charging voltage for each battery. The tamper detection section detects battery replacement by the following steps.

[Steps n=1, 2]

Detect charging voltage for each battery being charged, and determine if any battery has reached full charge.

[Step n=3]

If any battery has reached full charge, measure the voltage of each battery, and store those battery voltage values.

[Steps n=4-6]

Compare each battery voltage with the last stored voltage and determine if any battery voltage has changed more than specified limits. If any battery voltage has changed more than the specified limits, conclude that batteries were exchanged and output a tamper signal. When no battery voltage has changed more than the specified limits, conclude there was no battery exchange.

Figure 24:
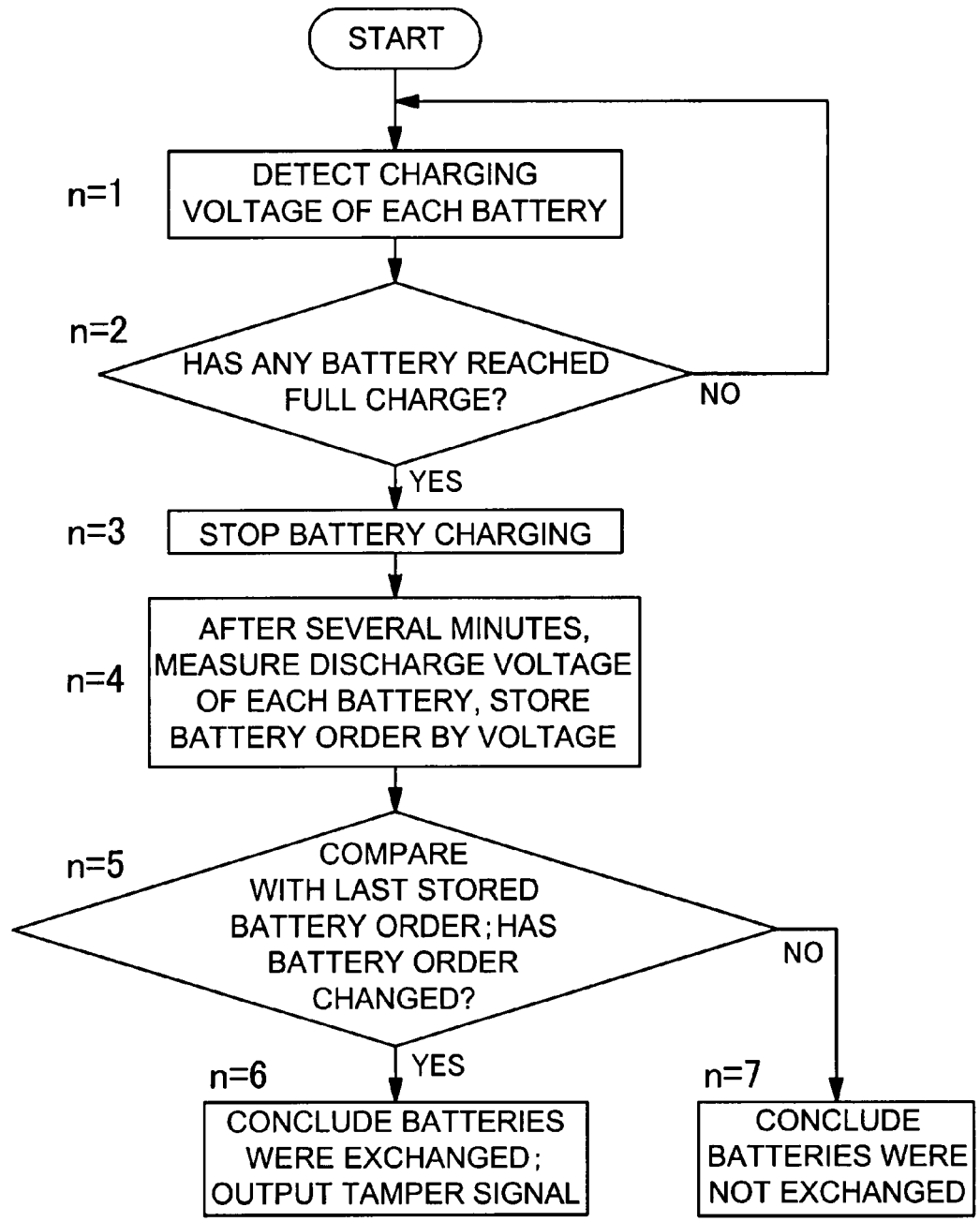
FIG. 24 is a flow chart for another embodiment of control circuit detection of battery replacement.

FIG. 24 is a flowchart for detection of battery replacement from the order of the open circuit voltage for each battery after reaching full charge. The tamper detection section detects battery replacement by the following steps.

[Steps n=1, 2]

Detect charging voltage for each battery being charged, and determine if any battery, or all batteries have reached full charge.

[Steps n=3, 4]

If battery full charge is detected, stop battery charging. After several minutes with charging suspended and no current flow, measure the open circuit voltage of each battery, and store the battery order by voltage (for example, highest voltage batteries first).

[Steps n=5-7]

Compare the battery order with the last stored battery order and determine if the battery order by voltage has changed. If battery order has changed, conclude that batteries were exchanged and output a tamper signal. When battery order has not changed, conclude there was no battery exchange.

Figure 25:
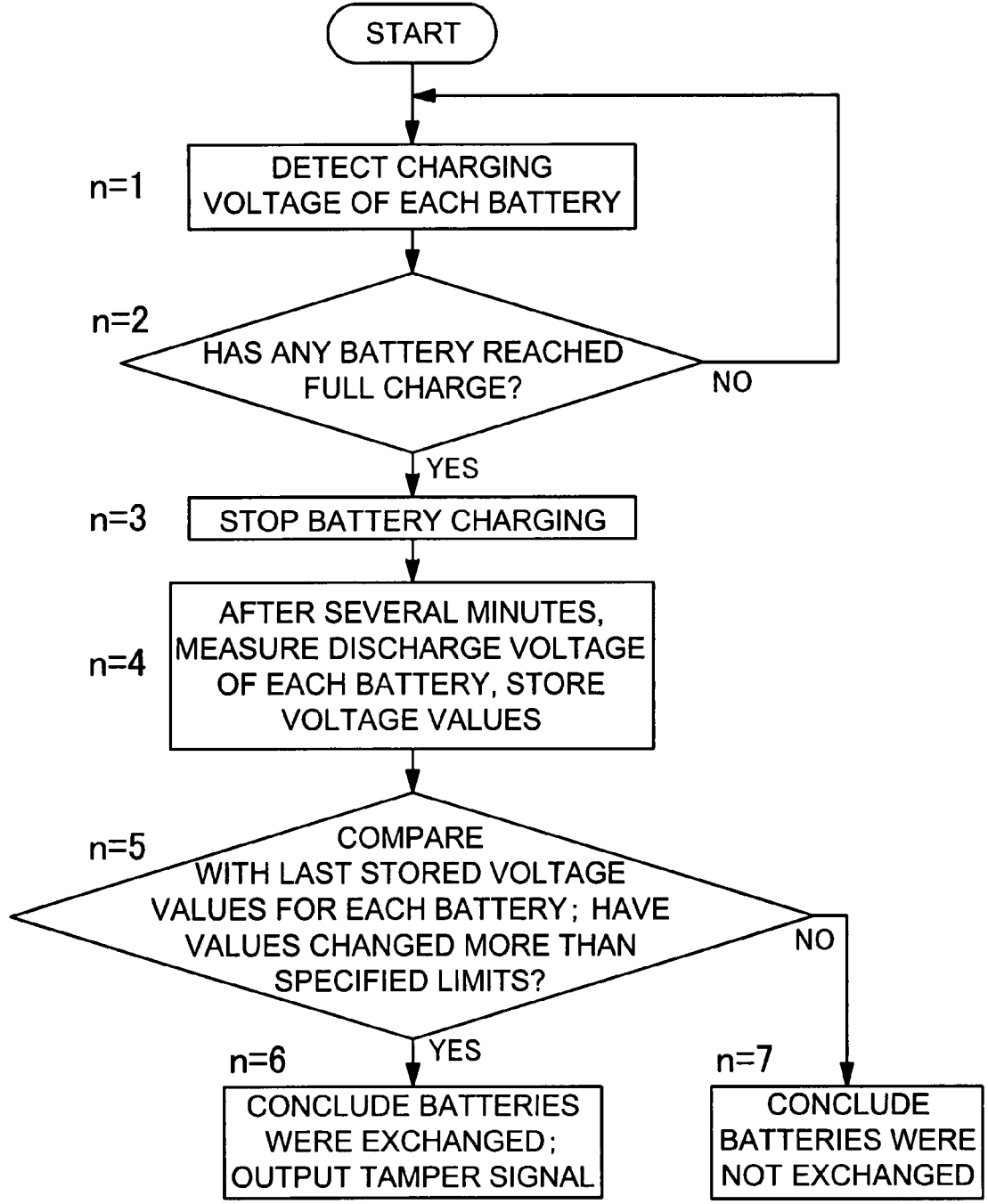
FIG. 25 is a flow chart for another embodiment of control circuit detection of battery replacement.

FIG. 25 is a flowchart for detection of battery replacement from the change in discharge voltage for each battery after reaching full charge. The tamper detection section detects battery replacement by the following steps.

[Steps n=1, 2]

Detect charging voltage for each battery being charged, and determine if any battery, or all batteries have reached full charge.

[Steps n=3, 4]

If battery full charge is detected, stop battery charging. After several minutes with charging suspended and no current flow, measure the open circuit voltage of each battery, and store those voltage values.

[Steps n=5-7]

Compare each battery voltage with the last stored voltage and determine if any battery voltage has changed more than specified limits. If any battery voltage has changed more than the specified limits, conclude that batteries were exchanged and output a tamper signal. When no battery voltage has changed more than the specified limits, conclude there was no battery exchange.

Figure 26:
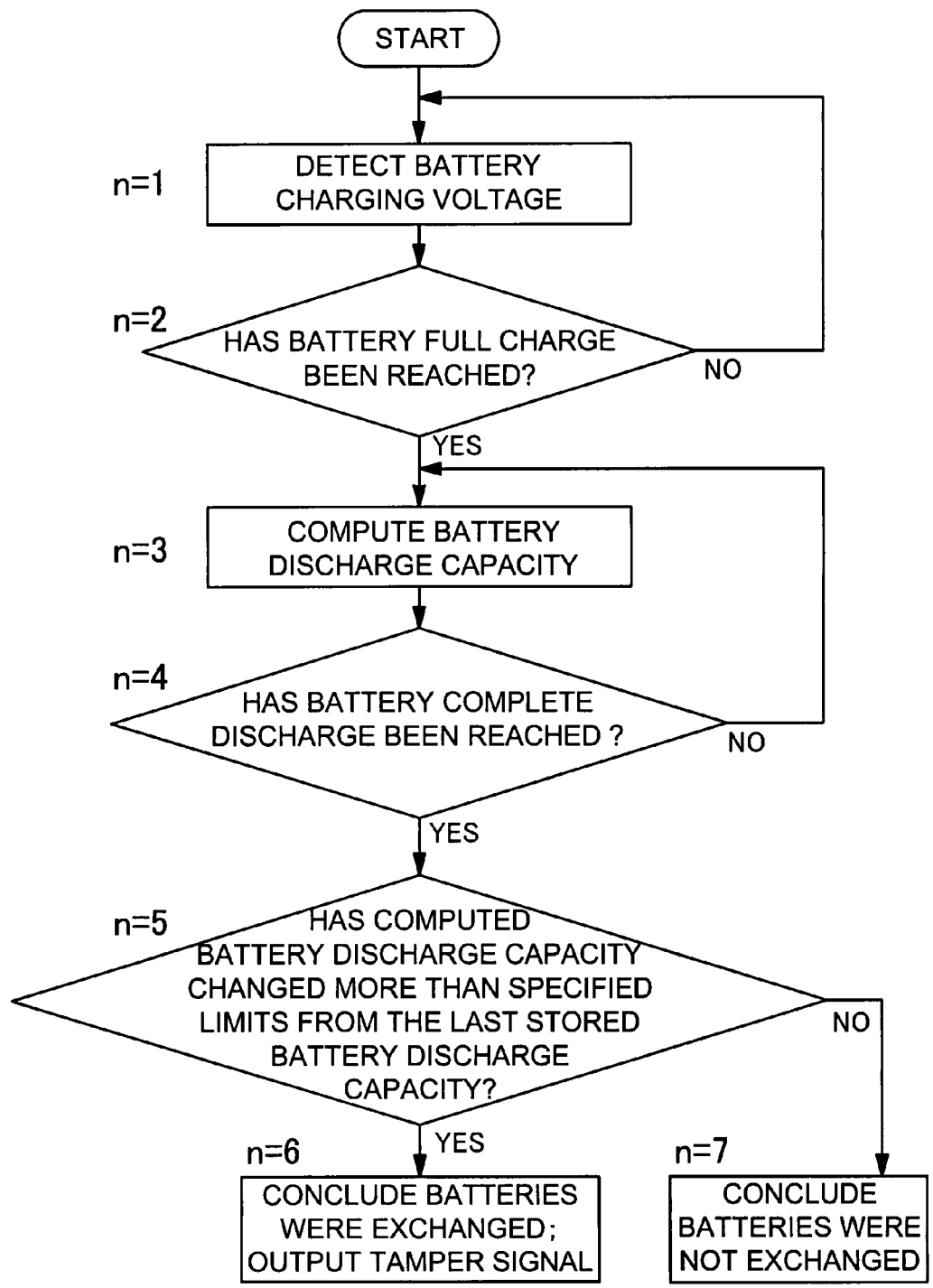
FIG. 26 is a flow chart for another embodiment of control circuit detection of battery replacement.

FIG. 26 is a flowchart for detection of battery replacement from a change in battery capacity. The tamper detection section detects battery replacement by the following steps.

[Steps n=1, 2]

Detect charging voltage for each battery being charged, and determine if battery full charge has been reached.

[Steps n=3, 4]

If battery full charge is detected, begin discharge capacity computation. Battery discharge capacity is computed by integrating battery discharge voltage and discharge current. Battery discharge capacity is computed by integrating until complete battery discharge. However, battery discharge capacity can also be computed by integrating until battery voltage drops to a set minimum voltage.

[Steps n=5-7]

Compare computed battery discharge capacity with the last stored battery discharge capacity and determine if battery capacity has changed from the stored battery capacity by more than specified limits. If battery capacity has changed more than the specified limits, conclude that batteries were exchanged and output a tamper signal. When battery capacity has not changed more than the specified limits, conclude there was no battery exchange.

The control section 103 detects a tamper signal from the tamper detection section 96 and puts the battery pack in an unusable state. The control section 103 turns the charging switch 93 off to disable battery charging, or it turns the discharge switch 94 off to make discharge impossible, or it blows the fuse 95 to disable both charging and discharging. Preferably, when the control section 103 detects a tamper signal from the tamper detection section 96, it turns the charging switch 93 off, it turns the discharge switch 94 off, and it blows the fuse 95 to put the battery pack in an unusable state.

However, when the control section 103 detects a tamper signal, it can also put the battery pack in an unusable state by turning off either the charging switch 93 or the discharge switch 94, or it can blow the fuse 95 without turning either the charging or discharge switch off.

The tamper detection section 96 can store battery voltage prior to the control circuit 97 going into an inactive or shutdown state, and detect battery replacement from that voltage value. The control circuit 97 is provided with a memory section (not illustrated) to store battery voltage prior to the control circuit 97 becoming inactive, that is prior to shutdown. The memory section is, for example, non-volatile memory. The tamper detection section 96 can determine whether the control circuit 97 was shutdown properly by the battery voltage contents of the memory section when the control circuit 97 was shutdown. In other words, the tamper detection section 96 can determine whether unauthorized battery removal shutdown the control circuit 97.

Here, the control circuit 97 shutdown process is explained for the battery pack of the present embodiment. When the battery pack is used as a power source for electrical equipment such as a notebook computer, battery pack battery capacity gradually decreases as the electrical equipment is used. When battery capacity drops to a level (for example, in the case of lithium ion batteries, battery voltage=2.7V) where electrical equipment operation should be suspended (the microcomputer in the electrical equipment should be shutdown), the control circuit 97 issues a terminate discharge alarm (TDA) indicating low capacity to the electrical equipment via the external terminal 104 described previously. The electrical equipment receives this alarm and its internal microcomputer shuts down. If left uncharged, battery pack battery capacity will drop to a minimum battery capacity (for example, in the case of lithium ion batteries, battery voltage=2.3V) due to self discharge and power consumption by internal battery pack components such as the control circuit. When this occurs, the control circuit 97 will shutdown to an inactive state. At that time, the control circuit memory section, which is non-volatile memory, will contain a record of the lowest battery voltage of the plurality of batteries 91. The memory section, which is non-volatile memory, is provided with a voltage storage location that stores the minimum battery voltage at control circuit shutdown. Subsequently, when the electrical equipment, to which the battery pack is attached, is connected to a commercial power source and power is supplied to the battery pack via the electrical equipment, the control circuit 97 returns to operating status.

Consequently, the tamper detection section 96 can determine whether battery voltage was stored in the memory section prior to control circuit shutdown. Namely, the tamper detection section 96 can determine whether the control circuit 97 was properly shutdown, and whether unauthorized battery removal occurred. Power supply to the control circuit 97 is interrupted without decrease in battery capacity when unauthorized battery removal occurs, and the control circuit 97 shuts down without storing battery voltage in the memory section (as information about battery capacity decrease at shutdown). As a result, unauthorized battery removal can be detected by finding no pre-shutdown battery voltage stored in the memory section. This detection is performed after the control circuit 97 has returned to operational status. For example, if the battery pack is connected to electrical equipment, unauthorized battery removal is determined after power is supplied to the control circuit 97 from the electrical equipment to restore control circuit 97 operation. Specifically, the tamper detection section 96 determines whether pre-shutdown battery voltage is stored in the memory section after the control circuit 97 has returned to operation. Said differently, the tamper detection section 96 determines whether the control circuit 97 was shutdown without storing battery voltage in the memory section after the control circuit 97 has returned to operation. If no battery voltage was stored in the memory section, the tamper detection section 96 issues a tamper signal.

Incidentally, unauthorized battery replacement can also take place after battery capacity has decreased and the control circuit 97 has shutdown normally. When this occurs, the memory section contains the pre-shutdown battery voltage (as information about battery capacity decrease). To detect this type of tampering, the tamper detection section 96 compares battery voltage after the control circuit 97 is restored to operation with the pre-shutdown battery voltage stored in the memory section. Specifically, the tamper detection section 96 compares battery voltage measured after operation of the control circuit 97 has been restored with battery voltage stored in the memory section. The tamper detection section 96 concludes unauthorized battery exchange and issues a tamper signal if the battery voltage after control circuit restoration is larger than the pre-shutdown battery voltage.

Figure 27:
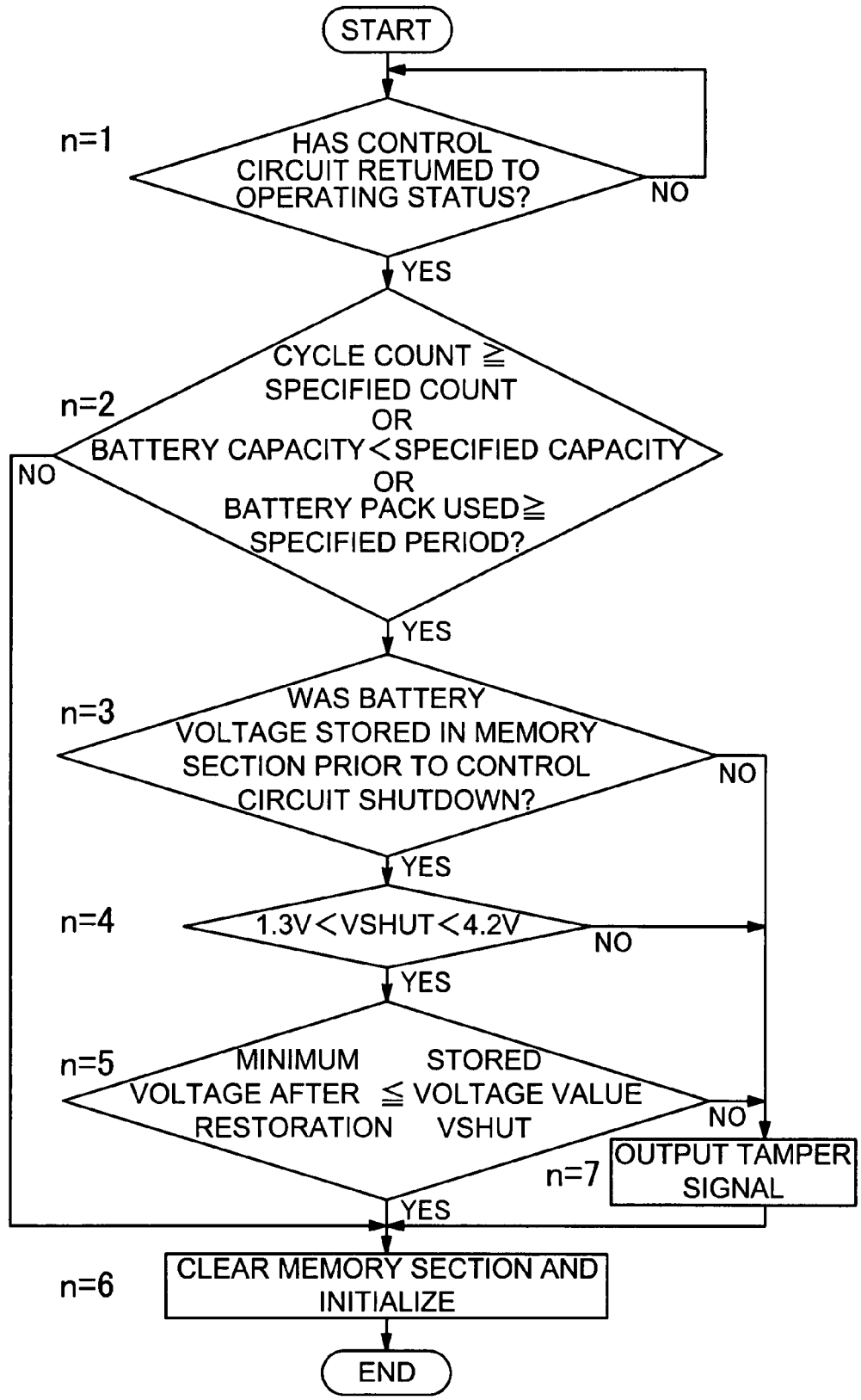
FIG. 27 is a flow chart for another embodiment of control circuit detection of battery replacement.

FIG. 27 is a flowchart for detection of battery replacement from the battery voltage value stored in the memory section before control circuit shutdown. The tamper detection section detects battery replacement by the following steps.

[Step n=1]

A battery pack, in which the control circuit has shutdown, is connected to electrical equipment. The battery pack is supplied power from the electrical equipment and the control circuit 97 becomes operational again. The battery pack of FIG. 15 is provided with a circuit to supply power to the control circuit 97 from the electrical equipment when it is connected to the electrical equipment.

[Step n=2]

This step determines whether conditions assumed for the detection functions of this embodiment are met. If any one of the following detection conditions is met, the detection procedure can proceed.

(1) The cycle count is greater than or equal to a specified count (for example, 100 cycles).

(2) Battery capacity has become less than initial capacity or nominal capacity (for example, less than or equal to half.

(3) Time since initial battery pack use is greater than or equal to a specified period (for example, 1 year). (This type of specified period can be measured by a timer in the control circuit, but time that the control circuit is shutdown is excluded from that measurement.)

These assumed conditions are added because it is believed batteries will not be replaced while they are still in new condition. When all the above conditions are not satisfied, flow jumps to step n=6. This (n=2) step can also be omitted.

[Step n=3]

This step determines whether battery voltage was stored in the memory section prior to control circuit shutdown. In the case where battery pack battery capacity decreases and the control circuit 97 shutdowns normally, battery voltage at shutdown is stored in the voltage storage location of the memory section, which is non-volatile memory. For example, the voltage value stored in the voltage storage location at shutdown is the minimum battery voltage. Consequently, the tamper detection section determines if shutdown was normal by whether the minimum battery voltage at shutdown is stored in the memory section. Whether the minimum battery voltage at shutdown is stored in the memory section is determined by whether the content of the non-volatile memory voltage storage location is the initial value (0xFFFF). If the initial value is in the voltage storage location, it is concluded that battery voltage was not stored in the memory section at shutdown. At this point, the tamper detection section concludes normal shutdown did not occur, and unauthorized battery replacement occurred. Flow jumps to Step n=7. If the initial value is not in the voltage storage location and the minimum battery voltage at shutdown is stored in the memory section, normal shutdown is concluded and flow proceeds to the next step.

[Step n=4]

This step determines if the minimum battery voltage at shutdown, Vshut, which is the voltage value stored in the non-volatile memory voltage storage location, is within specified limits. For example, if the minimum battery voltage at shutdown, Vshut, is greater than 1.3V but less than 4.2V, it is concluded to be a normal battery voltage. When the minimum battery voltage at shutdown, Vshut, is within specified limits, it is concluded to be normal and flow proceeds to the next step. If the minimum battery voltage at shutdown, Vshut, is outside specified limits, it is concluded to be an abnormal battery voltage, battery replacement is concluded and flow jumps to step n=7.

[Step n=5]

The restored control circuit 97 measures the voltage of each of the plurality of batteries 91 and determines the battery with minimum voltage. The control circuit 97 compares this minimum battery voltage with the voltage value stored in the non-volatile memory voltage storage location (the minimum battery voltage at shutdown, Vshut). If the minimum voltage after control circuit 97 restoration is greater than the stored voltage value, Vshut, battery replacement is concluded and flow jumps to step n=7. If the minimum voltage after control circuit 97 restoration is less than or equal to the stored voltage value, Vshut, normal operation is concluded and flow proceeds to the next step.

[Step n=6]

This step clears and initializes the non-volatile memory voltage storage location of the memory section. Normal battery pack operation including charging and discharging is started.

[Step n=7]

The tamper detection section 96 concludes unauthorized battery removal or exchange has occurred and issues a tamper signal.

An additional embodiment to the embodiment described in FIG. 27 is described below using the flowchart of FIG. 28. In step n=3 of FIG. 27 and its description, if NO is decided and flow jumps to step n=7, unauthorized battery replacement can be mistakenly concluded even though unauthorized battery replacement did not take place. For example, temporary power interruption for a short period (transient shutdown), which includes noise, can cause abnormal shutdown of the control circuit 97. As a result, the control circuit 97 shuts down without storing the battery voltage at shutdown in the voltage storage location of the memory section, which is non-volatile memory. The embodiment of the flowchart of FIG. 27 has the problem that this is judged to be abnormal shutdown, unauthorized battery replacement is concluded, and flow jumps to step n=7.

Figure 28:
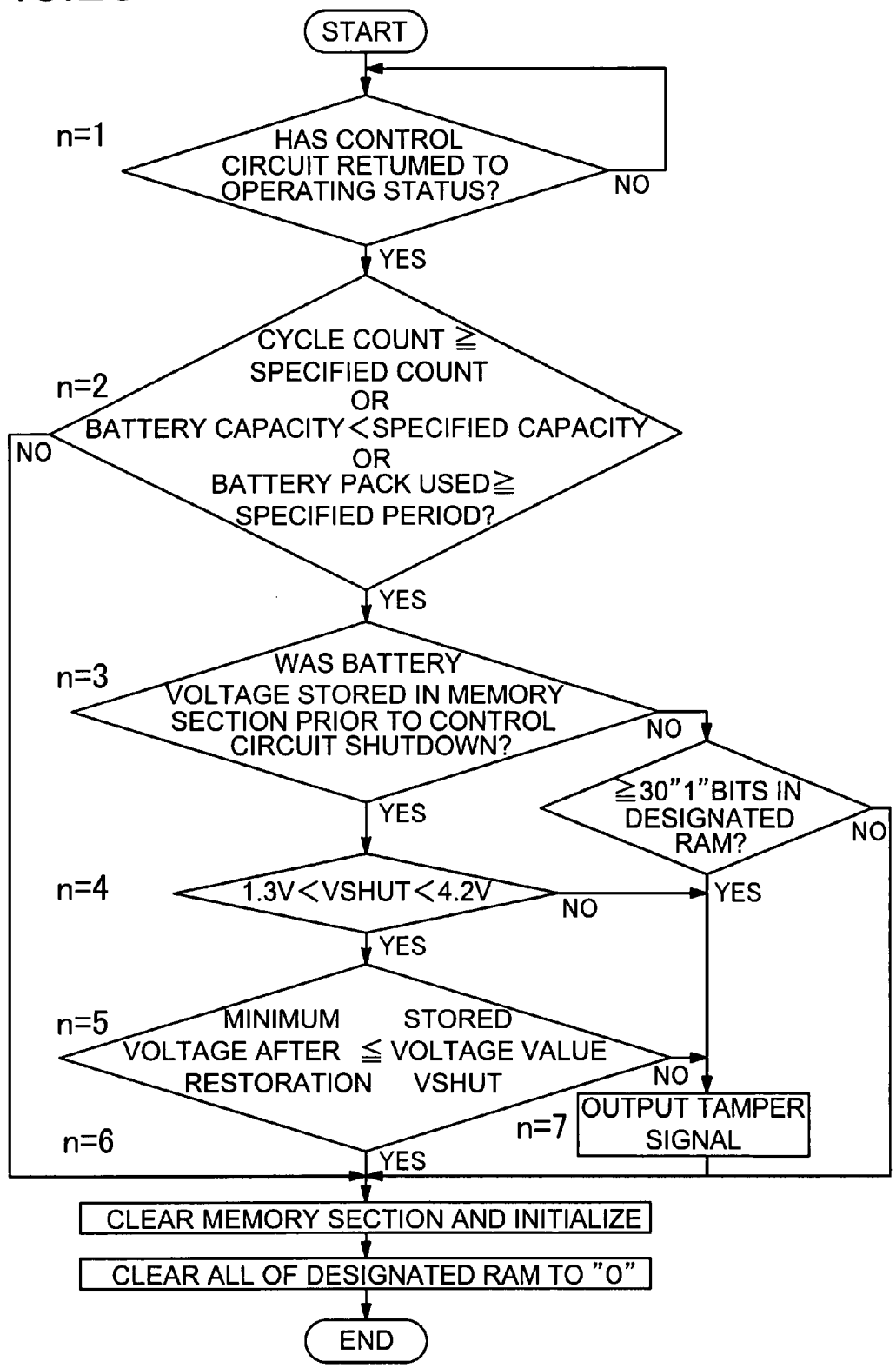
FIG. 28 is a flow chart for another embodiment of control circuit detection of battery replacement.

To eliminate this type of problem, the embodiment shown in the flowchart of FIG. 28 is provided with the following configuration and techniques. Flowchart steps and techniques that are the same as in FIG. 27 are given the same step numbers, their description is abbreviated, and only the differences are described below. In the control circuit 97 control section 103, which is a microcomputer, volatile memory such as dynamic random access memory (DRAM) or static random access memory (SRAM) is generally integrated within the microcomputer and used as main memory for program execution. If the power supply drops, the contents of DRAM and SRAM are not retained, and after power restoration, RAM contents will be random values. However, a microcomputer with RAM backup capability has capacitors connected to retain RAM contents and prevent instant content loss due to transient power interruption. The control section 103 is provided with a specified section of RAM (designated RAM) and this designated RAM, for example, 16 bytes or 128 bits, is initialized with all 0's. In this embodiment, the control circuit 97 has an initialized section of main memory (designated RAM) at startup. If that section of main memory retains its initialized state when the control circuit 97 returns to operating status after a shutdown, temporary power loss is concluded and no battery replacement can be concluded. As a result, battery replacement is not mistakenly concluded for transient shutdown and restoration of the control circuit due to temporary power interruption. The contents of the specified section of main memory reflect the electrical characteristics of the batteries 91 and indicate change in those electrical characteristics. Specifically, the control section 103 confirms the all zero content of designated RAM after shutdown and restart before it re-initializes its contents to all 0's. Here, after start-up designated RAM was previously initialized to all 0's, transient shutdown occurred, then upon restart almost all bits of the 16 bytes of RAM were retained as 0's due to the backup capability described above (the initialized state was retained and few bits contain 1's). In contrast, for restart after a long period of interruption including unauthorized battery replacement, charge on the RAM backup capacitors completely decays and RAM contents are lost. Due to RAM retention characteristics, contents of the data bits become completely random and tend to contain approximately half 1's and half 0's. Consequently, at restart the number of bits of the 128 bits of designated RAM that have become 1's can be counted. If the number of 1's is greater than or equal to a specified number, for example 30, restart after a long period of interruption can be concluded. If the number of 1's is less than 30, restart after transient shutdown can be concluded.

In a control section 103 provided with the functions described above, shutdown due to unauthorized battery removal can be determined by the steps described below. Again, flowchart steps and techniques that are the same as in FIG. 27 are given the same step numbers, their description is abbreviated, and only the differences are described below.

In step n=3, when designated RAM does not contain the initialized value and the minimum battery voltage at shutdown is stored in the memory section, normal shutdown is concluded and flow proceeds to the next step. Otherwise, it is concluded that the memory section does not contain the minimum battery voltage at shutdown and flow jumps to step n=10 below.

In step n=10, contents of designated RAM are checked to determine whether the number of bits of the 128 bits that have become 1's is greater than or equal to a specified number of bits (for example, 30). If the number of 1's is greater than or equal to the specified number, YES is concluded indicating restart after a long period of interruption and unauthorized battery removal. Flow jumps to step n=7. If the number of 1's is less than the specified number, NO is concluded indicating interruption due to transient shutdown and no unauthorized battery removal. Flow jumps to step n=6. After step n=6, designated RAM is re-initialized to all 0's in step n=11.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-98587 filed in Japan on Mar. 31, 2006, Application No. 2006-130420 filed in Japan on May 9, 2006, Application No. 2006-164513 filed in Japan on Jun. 14, 2006, and Application No. 2006-204007 filed in Japan on Jul. 26, 2006, the contents of which are incorporated herein by reference.

What is claimed is:

1. A battery pack comprising:
   a plurality of batteries;
   a current cut-off device connected in series with the batteries;
   a tamper detector for detecting tampering and issuing a tamper signal; and
   a control circuit connected to the tamper detector,
   wherein the control circuit switches the current cut-off device off to cut-off battery current in response to a tamper signal output from the tamper detector.

2. The battery pack as recited in claim 1, further comprising a case which houses the batteries, wherein the tamper detector is a disassembly detection switch that detects disassembly of the case, and the control circuit switches the current cut-off device off in response to a disassembly signal from the disassembly detection switch.

3. The battery pack as recited in claim 1, wherein the current cut-off device is a charging switch that controls battery charging.

4. The battery pack as recited in claim 1, wherein the current cut-off device is a discharge switch that controls battery discharge.

5. The battery pack as recited in claim 1, wherein the current cut-off device a fuse connected in series with the batteries.

6. The battery pack as recited in claim 2, wherein the control circuit is provided with memory to store the disassembly signal output from the disassembly detection switch.

7. The battery pack as recited in claim 2, wherein the disassembly detection switch is a light sensor that detects light and switches on and off.

8. The battery pack as recited in claim 7, wherein the light sensor is a photo-detector or a photo-coupler.

9. The battery pack as recited in claim 2, wherein the disassembly detection switch is made up of conducting material.

10. The battery pack as recited in claim 2, wherein the case includes a plurality of mutually connected unit cases, and the disassembly detection switch detects unit case disassembly and outputs a disassembly signal.

11. The battery pack as recited in claim 10, wherein each of the unit cases houses a plurality of the batteries and is provided with connectors that are mutually connected in the assembled state; and the batteries housed in the unit cases are connected by those connectors.

12. The battery pack as recited in claim 11, wherein the disassembly detection switch is made up of the connectors provided on the unit cases; and if the unit cases are disassembled and the connectors become separated, the disassembly detection switch is switched off.

13. The battery pack as recited in claim 10, wherein the current cut-off device is a fuse.

14. The battery pack as recited in claim 10, wherein the control circuit is provided with memory to store a cut-off ID to cut-off the current cut-off device in response to a disassembly signal from the disassembly detection switch.

15. The battery pack as recited in claim 10, wherein the control circuit is provided with memory to store a cut-off ID to cut-off the current cut-off device in response to a disassembly signal from the disassembly detection switch; the memory being memory in which the cut-off ID can be re-written; and the cut-off ID is re-written to this memory to prevent cut-off of the current cut-off device during authorized disassembly of the unit cases.

16. The battery pack as recited in claim 2, wherein the current cut-off device and the batteries are electrically connected; a plurality of interconnected circuit boards are provided; and the disassembly detection switch detects circuit board disassembly and outputs a disassembly signal.

17. A battery pack comprising:
   a plurality of batteries;
   a current cut-off device connected in series with the batteries;
   a tamper detector for detecting tampering and issuing tamper signals; and
   a control unit connected to the tamper detector,
   wherein the control circuit comprises a tamper detector that detects battery replacement from a change in battery electrical characteristics, and
   wherein the control circuit detects electrical characteristics of each of the batteries, and battery replacement is determined from change in the electrical characteristics.

18. The battery pack as recited in claim 17, wherein the control circuit detects the discharge voltage of each of the batteries, and battery replacement is determined from change in the discharge voltage, or from an order of the discharge voltages.

19. The battery pack as recited in claim 17, wherein the control circuit detects the charging voltage of each of the batteries, and battery replacement is determined from change in the charging voltage, or from the an order of the charging voltages.

20. The battery pack as recited in claim 17, wherein the control circuit detects discharge voltage of each of the batteries after reaching full charge, and determines battery replacement from change in the discharge voltage or from an order of the discharge voltages.

21. A battery pack comprising:
   a plurality of batteries;
   a current cut-off device connected in series with the batteries;
   a tamper detector for detecting tampering and issuing a tamper signal; and
   a control circuit connected to the tamper detector,
   wherein the control unit comprises a tamper detector that detects battery replacement from change in battery electrical characteristics, and
   wherein the control circuit detects battery capacity, and determines battery replacement from change in capacity.

22. A battery pack comprising:
- a plurality of batteries;
- a current cut-off device connected in series with the batteries;
- a tamper detector for detecting tampering and issuing a tamper signal; and
- a control circuit connected to the tamper detector,
- wherein the control circuit comprises a tam-per detector that detects battery replacement from a change in battery electrical characteristics, and
- wherein the control circuit is provided with a memory section to store battery voltage before shutdown, and determine battery replacement from the voltage value stored in the memory section.

23. The battery pack as recited in claim 22, wherein the control circuit concludes battery replacement when it shuts down without storing battery voltage in the memory section.

24. The battery pack as recited in claim 22, wherein the control circuit compares the voltage value stored in the memory section before shutdown with the battery voltage after return to operation, and concludes battery replacement when the battery voltage after return to operation is larger than the voltage value stored in the memory section.

25. A battery pack comprising:
- a plurality of batteries;
- a current cut-off device connected in series with the batteries;
- a tamper detector for detecting tampering and issuing a tamper signal; and
- a control circuit connected to the tamper detector,
- wherein the control circuit comprises a tamper detector that detects battery replacement from a change in battery electrical characteristics,
- wherein the control circuit is provided with a designated area of main memory that is initialized after control circuit activation, and when the control circuit activates after a shutdown and the initialized state of the designated area is retained, temporary power interruption, with no battery replacement is concluded.

* * * * *